US010487706B2

(12) United States Patent
Bonde et al.

(10) Patent No.: US 10,487,706 B2
(45) Date of Patent: *Nov. 26, 2019

(54) LUBRICATING SYSTEM FOR INTERNAL COMBUSTION ENGINE, OIL PAN APPARATUS, AND INTERNAL COMBUSTION ENGINE

(71) Applicant: Kohler Co., Kohler, WI (US)

(72) Inventors: Kevin G. Bonde, Keil, WI (US); Ronald V. Post, Manitowoc, WI (US)

(73) Assignee: KOHLER CO., Kohler, WI (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/428,278

(22) Filed: Feb. 9, 2017

(65) Prior Publication Data
US 2017/0152774 A1 Jun. 1, 2017

Related U.S. Application Data

(63) Continuation of application No. 14/169,940, filed on Jan. 31, 2014, now Pat. No. 9,624,797.

(51) Int. Cl.
*F01M 1/16* (2006.01)
*F01M 1/02* (2006.01)
(Continued)

(52) U.S. Cl.
CPC .............. *F01M 1/16* (2013.01); *F01M 1/02* (2013.01); *F01M 1/10* (2013.01); *F01M 5/002* (2013.01);
(Continued)

(58) Field of Classification Search
CPC .......... F01M 11/03; F01M 1/16; F01M 5/002; F01M 1/02; F01M 1/10; F01M 11/0004
See application file for complete search history.

(56) References Cited

U.S. PATENT DOCUMENTS 3,485,324 A 12/1969 Novak
6,551,082 B2 4/2003 Douzono et al.
(Continued)

FOREIGN PATENT DOCUMENTS

CN 101796270 8/2010
DE 1807639 8/1969
(Continued)

OTHER PUBLICATIONS

Corresponding Chinese Office Action dated Dec. 9, 2016.

*Primary Examiner* — Jacob M Amick
(74) *Attorney, Agent, or Firm* — The Belles Group, P.C.

(57) ABSTRACT

A valve system is disclosed herein. The valve system, in one arrangement, may comprise: a fluid pathway for transporting a fluid; a first valve operably coupled to the fluid pathway, the first valve comprising a first resilient element; a second valve operably coupled to the fluid pathway, the second valve comprising a second resilient element that is substantially identical to the first resilient element; wherein, when the first valve is in a closed state, the first resilient element is compressed to a first length so that the first valve opens at a first pressure; and wherein, when the second salve is in a closed state, the second resilient element is compressed to a second length so that the second valve opens at a second pressure, the first length is less than the second length such that the second pressure is less than the first pressure.

19 Claims, 14 Drawing Sheets

(51) Int. Cl.
*F01M 1/10* (2006.01)
*F01M 5/00* (2006.01)
*F01M 11/00* (2006.01)
*F01M 11/03* (2006.01)
*F16K 15/04* (2006.01)

(52) U.S. Cl.
CPC ......... *F01M 11/0004* (2013.01); *F01M 11/03* (2013.01); *F16K 15/044* (2013.01); *F01M 2005/004* (2013.01); *F01M 2011/0025* (2013.01); *F01M 2011/0029* (2013.01); *F01M 2011/0066* (2013.01); *F01M 2011/0079* (2013.01)

(56) References Cited

U.S. PATENT DOCUMENTS

| | | | |
|---|---|---|---|
| 6,732,701 B2 | 5/2004 | Bonde et al. | |
| 7,299,994 B2 | 11/2007 | Brown et al. | |
| 7,992,385 B2 | 8/2011 | Shimizu et al. | |
| 8,312,857 B2 | 11/2012 | Jessberger et al. | |
| 8,336,515 B2 | 12/2012 | Jainek et al. | |
| 9,624,797 B2 * | 4/2017 | Bonde | F01M 1/02 |
| 2003/0131819 A1 * | 7/2003 | Paro | F01M 1/16 123/196 R |
| 2004/0000285 A1 | 1/2004 | Bonde et al. | |
| 2004/0104075 A1 | 6/2004 | Ito et al. | |
| 2008/0314572 A1 | 12/2008 | Hommes | |
| 2009/0025922 A1 | 1/2009 | Strzelczyk et al. | |
| 2010/0037850 A1 | 2/2010 | Jessberger | |
| 2010/0192898 A1 | 8/2010 | Ni | |
| 2013/0180496 A1 | 7/2013 | Murphy et al. | |

FOREIGN PATENT DOCUMENTS

| | | |
|---|---|---|
| DE | 149949 | 8/1981 |
| EP | 0807748 | 11/1997 |
| JP | H03117607 | 5/1991 |
| KR | 100566090 | 3/2006 |

* cited by examiner

LUBRICATING SYSTEM FOR INTERNAL COMBUSTION ENGINE, OIL PAN APPARATUS, AND INTERNAL COMBUSTION ENGINE

CROSS-REFERENCE TO RELATED PATENT APPLICATION

The present application is a continuation application of U.S. Nonprovisional patent application Ser. No. 14/169,940, filed Jan. 31, 2014, the entirety of which is incorporated by reference herein.

FIELD OF THE INVENTION

The present invention relates to a valve system which may be used, for example, in a lubrication system or other fluid transport systems.

BACKGROUND OF THE INVENTION

Lubricating systems for internal combustion engines are known. In certain known lubricating systems, a lubricating oil drops to a basin at a bottom portion of a crankcase housing after lubricating one or more portions of the internal combustion engine. The recovered oil is then fed through an oil cooler where thermal energy is removed from the oil and the cooled oil is fed to an oil filter. After passing through the oil filter, the cooled oil is again introduced to the one or more portions of the internal combustion engine in need of lubrication. The oil then drops back to the basin, thereby completing the oil circuit for cyclical use.

In certain known oil lubricating systems, such as the one described above, oil pump output capacity, by design, significantly exceeds lubricating demand under most, if not all engine operating conditions and speeds. To prevent an excessive build-up of pressure (and resulting pump or other components damage) when oil supply exceeds oil demand, a pressure relief valve is provided in the oil circuit immediately downstream of the oil pump and upstream of all other lubricating system components, including the oil cooler. Thus, if the oil pressure within the oil circuit builds up at the position of the pressure relief valve, the pressure relief valve will open, thereby alleviating the pressure by discharging the oil back into the oil reservoir in the basin. Pressure buildup can occur, for example, during engine startup when the oil is cold and has increased viscosity, in instances where the oil filter or other part of the oil circuit become blocked/clogged, and during most, if not all engine operating conditions when pump output exceeds lubricating oil requirements of the engine. Thus, the pressure relief valve provides a mechanism by which the excessive pressure within the oil circuit is eliminated by dumping the oil back into the oil reservoir.

During engine cold start conditions, because the oil is dumped back into the oil reservoir prior to flowing through the oil cooler, the temperature of the oil in the oil reservoir will build up faster when the pressure relief valve is an open state. However, since the pressure relief valve never returns to the fully closed state once normal engine operating conditions are reached, the oil may not be adequately cooled prior to being reintroduced to the portions of the internal combustion engine in need of lubrication.

Thus, a need exists for a lubricating system for an internal combustion engine that can both relieve oil pressure within the oil circuit as needed while at the same time increasing the amount of thermal energy removed from the oil.

SUMMARY OF THE INVENTION

According to one aspect of the present disclosure, a lubricating system for an internal combustion engine is disclosed that includes a dual pressure relief arrangement, wherein a first pressure relief valve and a second pressure relief valve are operably coupled to the oil circuit. The first pressure relief valve may be operably coupled to the oil circuit upstream of the oil cooler and configured to open so as to allow oil to return to the oil reservoir without passing through the oil cooler. The second pressure relief valve may be operably coupled to the oil circuit downstream of the oil cooler and configured to open so as to allow oil to return to the oil reservoir after passing through the oil cooler. The first pressure relief valve may be configured to open at a first predetermined pressure while the second pressure relief valve may be configured to open at a second predetermined pressure, the second predetermined pressure being less than the first predetermined pressure. An oil pump may be provided to drive the oil through the oil circuit.

In one aspect, the invention can be a lubrication system for an internal combustion engine, the lubrication system comprising: an oil cooler; an oil cooler supply passage for delivering oil to an inlet of the oil cooler from an oil reservoir; an oil cooler outlet passage for delivering oil from an outlet of the oil cooler to one or more portions of the internal combustion engine to be lubricated; a first pressure relief valve operably coupled to the oil cooler supply passage, the first pressure relief valve configured to open at a first predetermined pressure to allow oil in the oil cooler supply passage to return to the oil reservoir without passing through the oil cooler; and a second pressure relief valve operably coupled to the oil cooler outlet passage, the second pressure relief valve configured to open at a second predetermined pressure to allow oil in the oil cooler outlet passage to return to the oil reservoir after passing through the oil cooler, the second predetermined pressure being less than the first predetermined pressure.

In another aspect, the invention can be an internal combustion engine that includes the lubrication system set forth above.

In a further aspect, the invention can be an oil pan apparatus for an internal combustion engine comprising: a body forming a basin: an oil reservoir in the basin; a first pressure relief valve operably coupled to an oil cooler supply passage to allow oil in the oil cooler supply passage to return to the oil reservoir without passing through an oil cooler; a second pressure relief valve operably coupled to an oil cooler outlet passage to allow oil in the oil cooler outlet passage to return to the oil reservoir after passing through the oil cooler; and the first pressure relief valve configured to open at a first predetermined pressure and the second pressure relief valve configured to open at a second predetermined pressure, the second predetermined pressure being less than the first predetermined pressure.

In an even further aspect, the invention can be an oil pan apparatus for an internal combustion engine comprising: a body forming a basin for holding an oil reservoir; a first pressure relief valve operably coupled to an oil cooler supply passage to allow oil in the oil cooler supply passage to return to the oil reservoir without passing through an oil cooler; a second pressure relief valve operably coupled to an oil cooler outlet passage to allow oil in the oil cooler outlet passage to return to the oil reservoir after passing through the oil cooler; and the first pressure relief valve configured to open at a first predetermined pressure and the second pressure relief valve configured to open at a second predetermined pressure, the second predetermined pressure being less than the first predetermined pressure.

In a still further aspect, the invention can be an oil pan apparatus for an internal combustion engine comprising: a body forming a basin for holding an oil reservoir; an oil pump in the basin, the oil pump having an inlet in fluid communication with the oil reservoir and an outlet; an oil filter mounting element; an oil cooler supply passage formed in the body extending from the outlet of the oil pump to a first opening in an outer surface of the body; a pre-filter section of an oil cooler outlet passage formed in the body and extending from a second opening in the outer surface of the body to a third opening in the outer surface of the body, the third opening positioned adjacent to or on the oil filter mounting element; a post-filter section of the oil cooler outlet passage formed in the body and extending from a fourth opening in the outer surface of the body to a fifth opening in the outer surface of the body, the fourth opening positioned adjacent to or on the oil filter mounting element; a first pressure relief valve located within the basin, the first pressure relief valve operably coupled to the oil cooler supply passage to allow oil in the oil cooler supply passage to return to the oil reservoir without passing through the third opening; and a second pressure relief valve located within the basin, the second pressure relief valve operably coupled to the pre-filter section of the oil cooler outlet passage to allow oil in the pre-filter section of the oil cooler outlet passage to return to the oil reservoir without passing through the fourth opening.

In a yet further aspect, the invention can be an internal combustion engine comprising the oil pan apparatus described above.

In an even further aspect, the invention can be valve system comprising: a fluid pathway for transporting a fluid; a first valve operably coupled to the fluid pathway, the first valve comprising a first resilient element; a second valve operably coupled to the fluid pathway, the second valve comprising a second resilient element that is substantially identical to the first resilient element; wherein, when the first valve is in a closed state, the first resilient element is compressed to a first length so that the first valve opens at a first pressure; and wherein, when the second valve is in a closed state, the second resilient element is compressed to a second length so that the second valve opens at a second pressure, the first length is less than the second length such that the second pressure is less than the first pressure.

In another aspect, the invention may be a valve system comprising: a fluid pathway for transporting a fluid; a first valve operably coupled to the fluid pathway, the first valve comprising a first resilient element having a first spring constant; a second valve operably coupled to the fluid pathway, the second valve comprising a second resilient element having a second spring constant; the second spring constant being substantially the same as the first spring constant; wherein, when the first valve is in a closed state, the first resilient element is deformed a first degree so that the first valve opens at a first pressure; and wherein, when the second valve is in a closed state, the second resilient element is deformed a second degree so that the second valve opens at a second pressure that is different than the first pressure.

In a further aspect, the invention may be a valve system comprising: a body; a fluid pathway for transporting a fluid, the fluid pathway comprising a first section formed in the body and a second portion formed in the body; a first valve operably coupled to the first section of the fluid pathway, the first valve comprising a first valve seat integrally formed as part of the body; and a second valve operably coupled to the second section of the fluid pathway, the second valve comprising a second valve seat integrally formed as part of the body.

Further areas of applicability of the present invention will become apparent from the detailed description provided hereinafter. It should be understood that the detailed description and specific examples, while indicating the preferred aspects of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EMBODIMENTS

Figure 1:
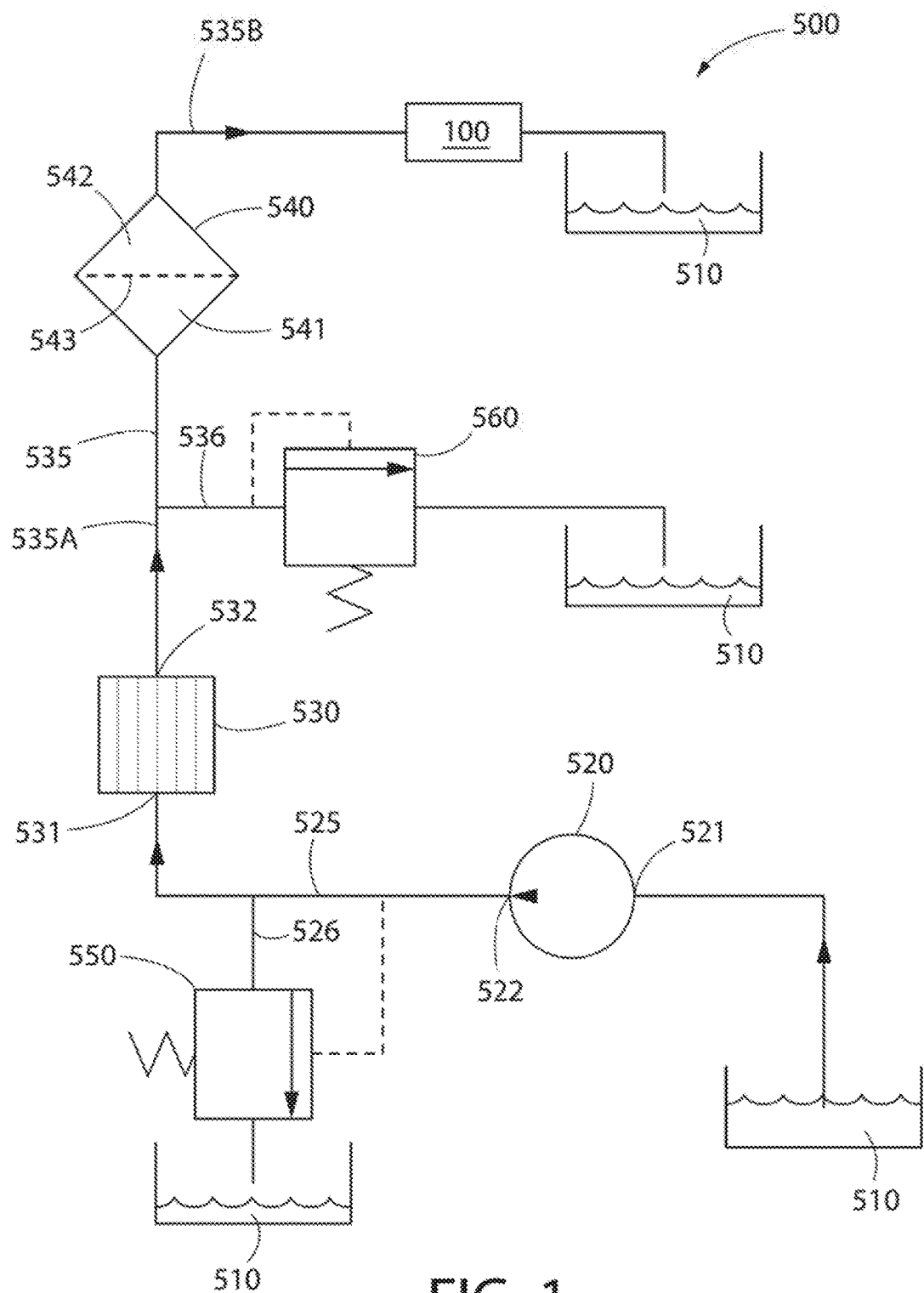
FIG. 1 is a fluid circuit schematic of a lubricating system for an internal combustion engine according to the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom"

as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a lubrication system 500 for an internal combustion engine according to the present invention is illustrated. The lubrication system 500 generally comprises, in fluid coupling, an oil reservoir 510, an oil pump 520, an oil cooler 530, and an oil filter 540. While the oil reservoir 510 is illustrated multiple times in FIG. 1, the oil reservoir 510 may be a single body of oil. The oil reservoir 510 may, however, be divided into a plurality of sub-reservoirs of oil that are in fluid communication with one another in certain other arrangements. The lubrication system 500 further comprises a first pressure relief valve 550 and a second pressure relief valve 560.

The lubrication system 500 delivers oil from the oil reservoir 510 to one or more portions 100 of the internal combustions that are to be lubricated (generically illustrated as box 100 in FIG. 1). The one or more portions 100 of the internal combustion can include, without limitation, the crankshaft, the crankshaft bearings, the connecting rod, the connecting rod bearings, the camshaft, the camshaft bearings, the cylinder block, the cylinder head, pistons (via spray devices known as piston squirters), hydraulic valve lifters, and valve train components. After the oil is delivered by the lubrication system 500 to the portions 100 of the internal combustion engine, the oil returns to the oil reservoir 510, thereby completing an oil circuit. The oil can return to the oil reservoir 510 via a gravity feed (i.e., allowing the oil to drop back to the oil reservoir). Alternatively, the oil can return to the oil reservoir 510 through one or more oil return passages 545 (see FIG. 2) in which pressure from the oil pump 520 generates flow in the oil return passages. Of course, combinations of gravity feed and forced feed may be utilized.

Figure 10:
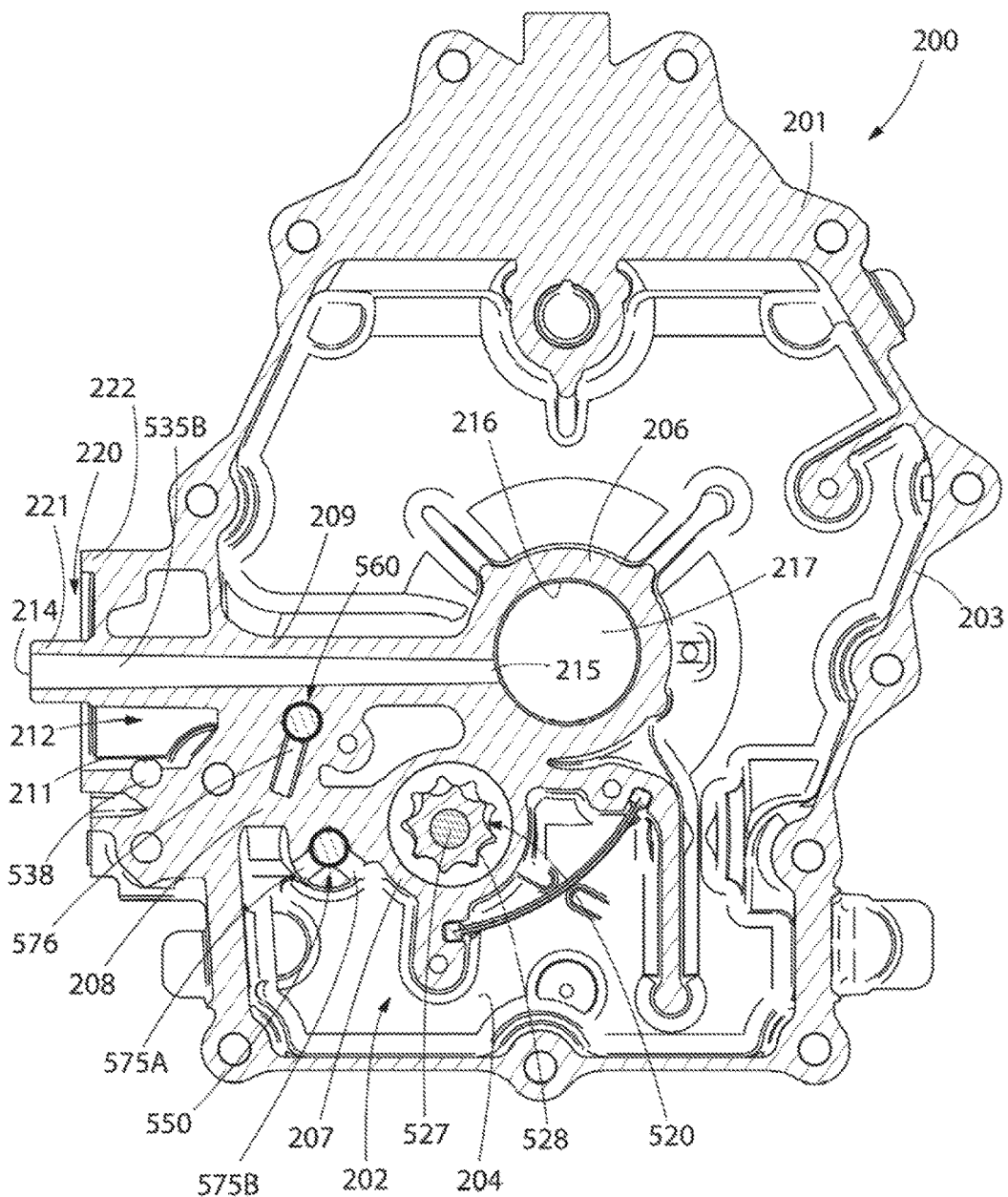
FIG. 10 is a horizontal cross-sectional view of the oil pan apparatus take along view X-X of FIG. 5.
Figure 11:
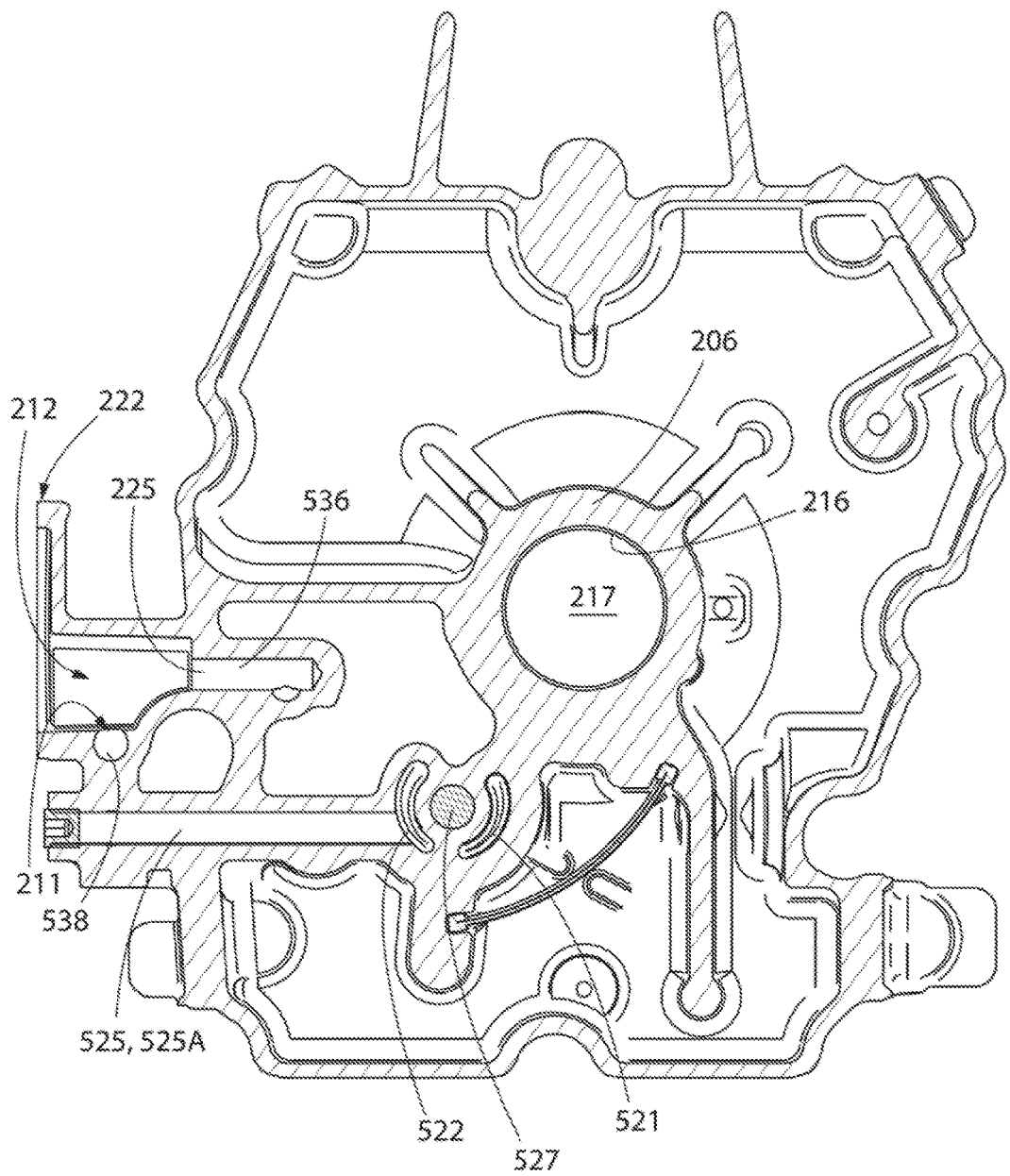
FIG. 11 is a horizontal cross-sectional view of the oil pan apparatus take along view XI-XI of FIG. 5.
Figure 12:
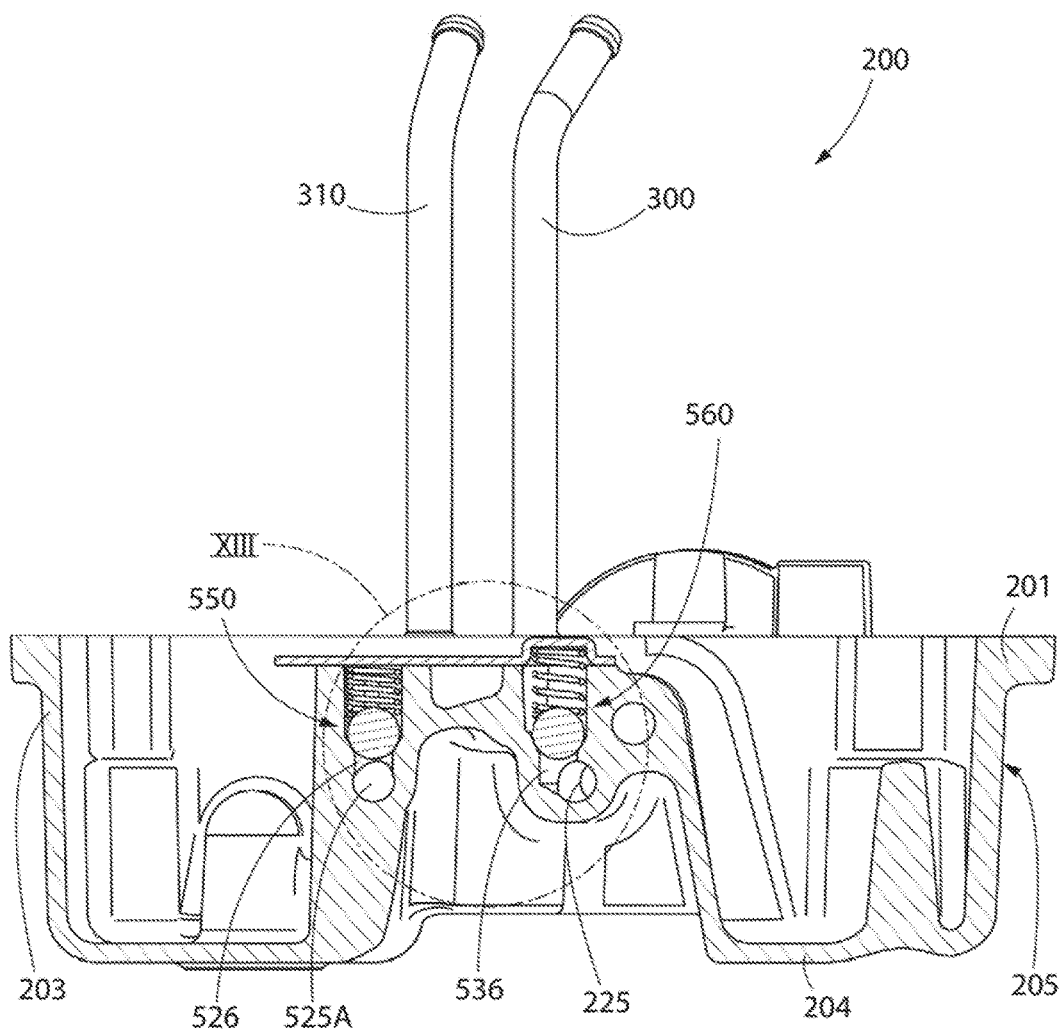
FIG. 12 is a vertical cross-sectional view of the oil pan apparatus take along view XII-XII of FIG. 6.

The oil pump 520 comprises an inlet 521 that is in fluid communication with the oil reservoir 510 and an outlet 522. The oil pump 510 may be a trochoid type pump (as shown in FIG. 10). Alternatively, the oil pump 510 may be any type of positive displacement pump (rotary or reciprocating), impulse pump, velocity pump, or gravity pump. Suitable types of positive displacement pumps may include, without limitation, gear pumps, screw pumps, rotary vane pumps, progressing cavity pumps, roots-type pumps, progressive cavity pumps, rotary gear pumps, piston pumps, diaphragm pumps, hydraulic pumps, regenerative (peripheral) pumps, peristaltic pumps, rope pumps, flexible impeller pumps, rotolliptic pumps, and plunger pumps. Suitable types of velocity pumps may include, without limitation, centrifugal pumps, radial-flow pumps, axial-flow pumps, mixed-flow pumps, and eductor-jet pumps. The exact type of oil pump utilized will be determined by: (1) the requirements of the lubricating system 500, such as system flow and pressure requirements; (2) the location of the oil pump 500 relative to the engine block; (3) the position of the oil pump 500 in the oil circuit relative to the other components thereof; (4) the driving mechanism utilized, space available within engine, and cost of the system.

The lubricating system 500 further comprises an oil cooler supply passage 525 that fluidly couples the oil pump 520 to the oil cooler 530. More specifically, the oil cooler supply passage 525 fluidly couples the outlet 522 of the oil pump 520 to an inlet 531 of the oil cooler 530. Thus, when the oil pump 520 is operating, oil in the oil reservoir 510 is drawn into the inlet 521 of the oil pump 520 and expelled from the outlet 522 of the oil pump 520. This oil is then delivered from the outlet 522 of the oil pump 520 to the inlet 531 of the oil cooler 530 via the oil cooler supply passage 525 (assuming that the first pressure relief valve 550 is closed, as discussed in greater detail below).

The oil cooler 530 is a heat exchanger that can transfer thermal energy between the oil flowing therethrough and a coolant fluid. As exemplified, the oil cooler 530 transfers thermal energy from the oil flowing therethrough to the coolant fluid. Any suitable coolant fluid can be utilized by the oil cooler 530. For example, the coolant may be air that flows over heat exchange fins of the oil cooler 530 or a liquid engine coolant that is delivered to the oil cooler 530 via a separate line/circuit. As the oil flows through oil cooler 530, which may be through a tortuous path, thermal energy is transmitted from the oil to the coolant fluid, thereby reducing the temperature of the oil. Thus, the oil has a hot temperature at the inlet 531 of the oil cooler 530 and a cold temperature 532 at the outlet 532 of the oil cooler 530, wherein the hot temperature is greater than the cold temperature. Alternatively, the oil cooler 530 may transfer thermal energy from the coolant fluid to the oil flowing therethrough in cases where it is desired to heat the oil.

The lubricating system 500 further comprises an oil cooler outlet passage 535 that fluidly couples the oil cooler 530 to the portions 100 of the internal combustion engine that are to be lubricated. During operation of the oil pump 522 (assuming that the second pressure relief valve 550 is closed, as discussed in greater detail below), the oil cooler outlet passage 535 delivers oil from the outlet 532 of the oil cooler 530 to the portions 100 of the internal combustion engine to be lubricated. Thus, oil that has been cooled by the oil cooler 530 is provided to the portions 100 of the internal combustion engine.

The oil filter 540 is operably coupled to the cooler outlet passage 535 between the outlet 532 of the oil cooler 530 and the portions 100 of the internal combustion engine. The oil filter 540 comprises a filter media 543, an inlet chamber 541, and an outlet chamber 542. The inlet and outlet chambers 541, 542 are located on opposite sides of the filter media 543. Thus, in order for oil to flow from the inlet chamber 541 to the outlet chamber 542, the oil must pass through the filter media 543, thereby filtering the oil by removing particulate and other contaminants. The oil filter 540 may be a cartridge type oil filter or a spin-on type oil filter, as is known in the art (discussed in greater detail in relation to FIG. 2). Other types of oil filters may be alternatively utilized, including without limitation centrifuge filters, gravity filters, and magnetic filters.

The oil filter 540 delineates the cooler outlet passage 535 into an pre-filter section 535A and a post-filter section 535B. It should be noted that the terms "pre-filter section" and "post-filter section" are intended to be relative to the oil filter 540. It is to be understood that the oil circuit may comprise additional filters at other locations. Thus, it is possible that the oil in the pre-filtered section has been previously filtered elsewhere in the oil circuit.

The pre-filter section 535A of the oil cooler outlet passage 535 extends from the outlet 532 of the oil cooler 530 to an inlet side of the filter media 543 of the oil filter 540. The pre-filter section 535A may be considered to include the inlet chamber 541 of the oil filter 540. The post-filter section 535B of the oil cooler outlet 540 extends from an outlet side of the filter media 543 of the oil filter 540 to the portions 100 of the internal combustion engine to be lubricated. The post-filter section 535B may considered to include the outlet chamber 542 of the oil filter 540. While the oil filter 540 is exemplified as being located downstream of the oil cooler 530, the oil filter 540 may be located upstream of the oil cooler 530, for example between the oil pump 520 and the oil cooler 530, or before the oil pump 520, in other arrangements. If an oil filter were located between the oil pump 520 and the oil cooler 530, such an oil filter 540 may be a relatively coarse screen that would keep large particles from getting into the first or second pressure relief valves 550, 560, or the oil cooler 530 itself, should the oil pump 520 start to break down and discharge relatively large pieces of metal. Additional oil filters may be included if desired. One such filter is a relatively coarse screen that may be located between the oil reservoir and the inlet to the oil pump.

The first pressure relief valve 550 is operably coupled to the oil cooler supply passage 525. More specifically, in the exemplified arrangement, the first pressure relief valve 550 is operably coupled to the oil cooler supply passage 525 via a first pressure relief passage 526 that is in fluid communication with the oil cooler supply passage 525. In alternate arrangements, the first pressure relief valve 550 may be operably coupled directly to the oil cooler supply passage 525. The first pressure relief valve 550 is configured to be normally closed and to open at a first predetermined pressure, thereby allowing oil in the oil cooler supply passage 525 to return to the oil reservoir 510 without passing through the oil cooler 530. Thus, when the pressure of the oil within the oil cooler supply passage 525 is at or above the first predetermined pressure, the first pressure relief valve 550 transitions from a closed-state to an open state, thereby allowing the oil within the oil cooler supply passage 525 to escape from the oil cooler supply passage 525 through the first pressure relief valve 550 and back into the oil reservoir 510, thereby relieving pressure within the oil circuit. The first pressure relief valve 550 will remain in the open state until the pressure of the oil within the oil cooler supply passage 525 falls below the first predetermined pressure. However, because the first pressure relief valve 550 is biased into the closed state, the first pressure relief valve 550 will automatically transition from the open state to the closed state upon the pressure of the oil within the oil cooler supply passage 525 falling below the first predetermined pressure.

The second pressure relief valve 560 is operably coupled to the oil cooler outlet passage 535. In the exemplified arrangement, the second pressure relief valve 560 is operably coupled to the oil cooler outlet passage 535 via a second pressure relief passage 536 that is in fluid communication with the oil cooler outlet passage 535. In alternate arrangements, the second pressure relief valve 560 may be operably coupled directly to the oil cooler outlet passage 535.

The second pressure relief valve 560 is operably coupled to the oil cooler outlet passage 535 at a position between the outlet 532 of the oil cooler 530 and the portions 100 of the internal combustion engine to be lubricated. As exemplified, the second pressure relief valve 560 may be operably coupled to the pre-filter section 535A of the oil cooler outlet passage 535 (i.e., at a position between the outlet 532 of the oil cooler 530 and the filter media 543 of the oil filter 540). In such an arrangement, opening of the second pressure relief valve 560 allows oil in the oil cooler outlet passage 535 to return to the oil reservoir 510 after passing through the oil cooler 530 but without passing through the filter media 543. In alternate arrangements, the second pressure relief valve 560 may be operably coupled to the post-filter section 535B of the oil cooler outlet passage 535 (i.e., at a position downstream of the filter media 543 of the oil filter 540).

The second pressure relief valve 560 is configured to be normally closed and to open at a second predetermined pressure, thereby allowing oil in the oil cooler outlet passage 535 to return to the oil reservoir 510 after passing through the oil cooler 530. Thus, when the pressure of the oil within the oil cooler outlet passage 535 is at or above the second predetermined pressure, the second pressure relief valve 560 transitions from a closed-state to an open state, thereby allowing the oil within the oil cooler outlet passage 535 to escape from the oil cooler outlet passage 535 through the second pressure relief valve 560 back into the oil reservoir 510, thereby relieving pressure within the oil circuit. The second pressure relief valve 560 will remain in the open state until the pressure of the oil within the oil cooler outlet passage 535 falls below the second predetermined pressure. However, because the second pressure relief valve 560 is biased into the closed state, the second pressure relief valve 560 will automatically transition from the open state to the closed state upon the pressure of the oil within the oil cooler outlet passage 535 falling below the second predetermined pressure. The second predetermined pressure may be less than the first predetermined pressure.

The second predetermined pressure may be selected so that it is ensured that the quantity of oil typically required for the particular internal combustion engine in which the lubrication system 500 is integrated can be cleaned through the oil filter 540 and delivered to the one or more portion 100 through the lubricating passages. The second predetermined pressure may, in certain instances, be established by a series of engine development tests in which the pressure in the furthest lubricating point of the one or more portions 100 is monitored to ensure that oil pressure at this further lubricating point does not drop below a lower oil pressure threshold required to ensure adequate oil flow to this furthest lubrication point. If it is determined that for the selected second predetermined pressure that the oil pressure at this further lubricating point drops below the minimum threshold, the second predetermined pressure is adjusted upward to ensure adequate oil flow to this furthest lubrication point. Increasing the second pressure setting to ensure adequate oil flow to this furthest lubrication point is balanced with an upper oil pressure threshold at which external leakage from the lubrication system 500 is determined to occur (such as through the crankshaft main bearing or any other seals in the lubrication system 500).

The first predetermined pressure may be selected to ensure that full output flow of the oil pump 520, at the highest normal operating speed of the internal combustion engine, flows through the oil cooler 530 when the oil is at an ordinary engine operating temperature, such as when the oil temperature is above 100° F. in certain embodiments. The first predetermined pressure may, in certain regards, be dependent on the type of oil cooler 530 utilized in the lubrication system.

A number of bench tests were run using different oil cooler designs at various flow rates and oil temperatures. It was determined for certain oil cooler designs, 20 psi was capable of delivering upwards of 3 gpm oil flow at oil temperatures of between 100° F. and 150° F. This means that setting the first pressure setting at about 20 psi higher than the second pressure setting, the first relief valve 550, at high normal engine speeds, will close at oil temperatures between 100° F. and 150° F. As a result, full output flow of the oil pump 520 flows through the oil cooler 530. Adjusting the ratio of the first to second pressure settings will affect the engine operating temperatures at various operating conditions.

The second predetermined pressure may be in a range of 10 to 30 psi in one preferred arrangement, 15 to 25 psi being more preferred, and most preferably about 20 psi. The second pressure relief valve 560 may, however, be configured to open at other pressures as is known in the art. The exact pressure selected for the second predetermined pressure may be based on a variety of consideration, including the desired operating parameters of the lubricating system 500, the type of oil being utilized, and the desired engine operating conditions.

The first predetermined pressure may be in a range of 35 to 55 psi in one preferred arrangement, and more preferably about 40 psi. The first pressure relief valve 550 may, however, be configured to open at other pressures as is known in the art. The exact pressure selected for the first predetermined pressure may be based on a variety of consideration, including the desired operating parameters of the lubricating system 500, the type of oil being utilized, and the desired engine operating conditions.

More specifically, the first and second predetermined pressures may be selected so that a ratio of the second predetermined pressure to the first predetermined pressure is less than 0.8:1, and more preferably less than about 0.6:1. In other arrangements, the first and second predetermined pressures may be selected so that a ratio of the second predetermined pressure to the first predetermined pressure is in a range of about 0.4:1 to 0.6:1. In one specific arrangement, the first and second predetermined pressures may be selected so that a ratio of the second predetermined pressure to the first predetermined pressure is about 0.5:1.

Suitable types of valves for the first and second pressure relief valves 550, 560 include, without limitation, ball check valves, disk check valves, sleeve-type relief valves, poppet-type relief valves. The first and second pressure relief valves 550, 560 can be the same type of valve or can be different types of valves. In one arrangement, the first and second pressure relief valves 550, 560 are the same type of valve. In one specific arrangement, the first and second pressure relief valves 550, 560 are structurally substantially identical to one another but have resilient elements that are compressed to different lengths in their normal states, thereby resulting in the first and second pressure relief valves 550, 560 having different actuation pressures (discussed in greater detail below).

The first pressure relief valve 550 relieves pressure within the oil circuit primarily during cold engine startups when the oil is viscous. The first pressure relief valve 550 may not open (or rarely open) during normal engine operating conditions (absent a major blockage or other critical pressure-inducing event). To the contrary, the second pressure relief valve 560 will open as necessary during normal engine operating conditions to relieve pressure in the oil circuit as needed. For example, if the oil pump 520 is a fixed displacement design, sized to deliver adequate lubrication at lowest operating speed of say 1200 rpm (low idle), then the oil pump output flow at the maximum operating speed of say 4000 rpm (high speed no load) will be significantly more than can flow through the lubrication passages with the secondary pressure available. Under those conditions, the second pressure relief valve 560 will be open and a significant quantity of oil will be bypassed back to the oil reservoir. As a result, the lubricating system 500 will maintain the pressure within the oil circuit within acceptable levels by opening the second pressure relief valve 560 while maintaining the first pressure relief valve 550 closed, thereby continuously flowing oil through the oil cooler 530 during normal engine operating conditions. Thus, during normal engine operating conditions, the oil is dumped back into the oil reservoir 510 only after passing through the oil cooler 530. This allows the oil in the oil circuit to have a lower temperature (as compared to lubricating systems that dump the oil back into the oil reservoir without passing through the oil cooler). As a result, an internal combustion engine utilizing the inventive lubricating system 500 may show a decrease in operating temperature that is in a range of 30° F. to 55° F., as compared to the same internal combustion engine utilizing a lubricating system that dumps the oil back into the oil reservoir without passing through the oil cooler.

Normal engine operating conditions vary significantly based upon the application for which the engine is used. For certain applications, engines may be rated at 3600 rpm, under full power, which is known as "wide open throttle" or WOT conditions. A typical commercial lawn mowing application will typically run at a lower engine speed range of 3200 to 3400 rpm (lower speed generally reduces noise and improves fuel efficiency), under 30% to 40% WOT power conditions. Other applications, such as pumps and generators will typically run at 3600 rpm, and can run at higher power levels such as 50% to 60% WOT.

In order to maintain the desired flow characteristics within the oil circuit under various engine conditions, the flow of the oil through the first and second pressure relief passages 526, 536 may be further controlled by properly designing the outlets of the first and second pressure relief passages 526, 536 to have effective cross-sectional areas that control flow rates of the oil even when the first and/or second pressure relief valves 550, 560 are open. For example, the outlet of the second pressure relief passage 536 may have an effective cross-sectional area that is less than the effective cross-sectional area of the first pressure relief passage 526.

The effective cross-sectional areas of the first and second pressure relief passages 526, 536 allow prediction of system operating pressure relative to how much load the relief valve spring applies to the ball check (discussed in greater detail below). If the effective cross-sectional area is too small for either of the first or second pressure relief passages 526, 536, additional restriction is created that will increase system operating pressure higher than expected, especially under cold oil conditions. Thus, as discussed in greater detail below, the first pressure relief passage 526 may have two outlets, as opposed to the second pressure relief passage 536 which has a single relief valve outlet.

In the exemplified arrangement, the lubricating system 500 comprises only one oil pump 520. The same oil pump 520 drives the flow of oil through the oil cooler 530 and through the oil filter 540 when the first and second pressure relief valves 550, 560 are closed. Thus, the lubricating system 500, in certain arrangements, is not be a dry sump lubrication system. However, in other arrangements, more than one oil pump 520 may be provided and operably coupled along the oil circuit as needed to achieve the desired oil flow parameters.

Figure 2:
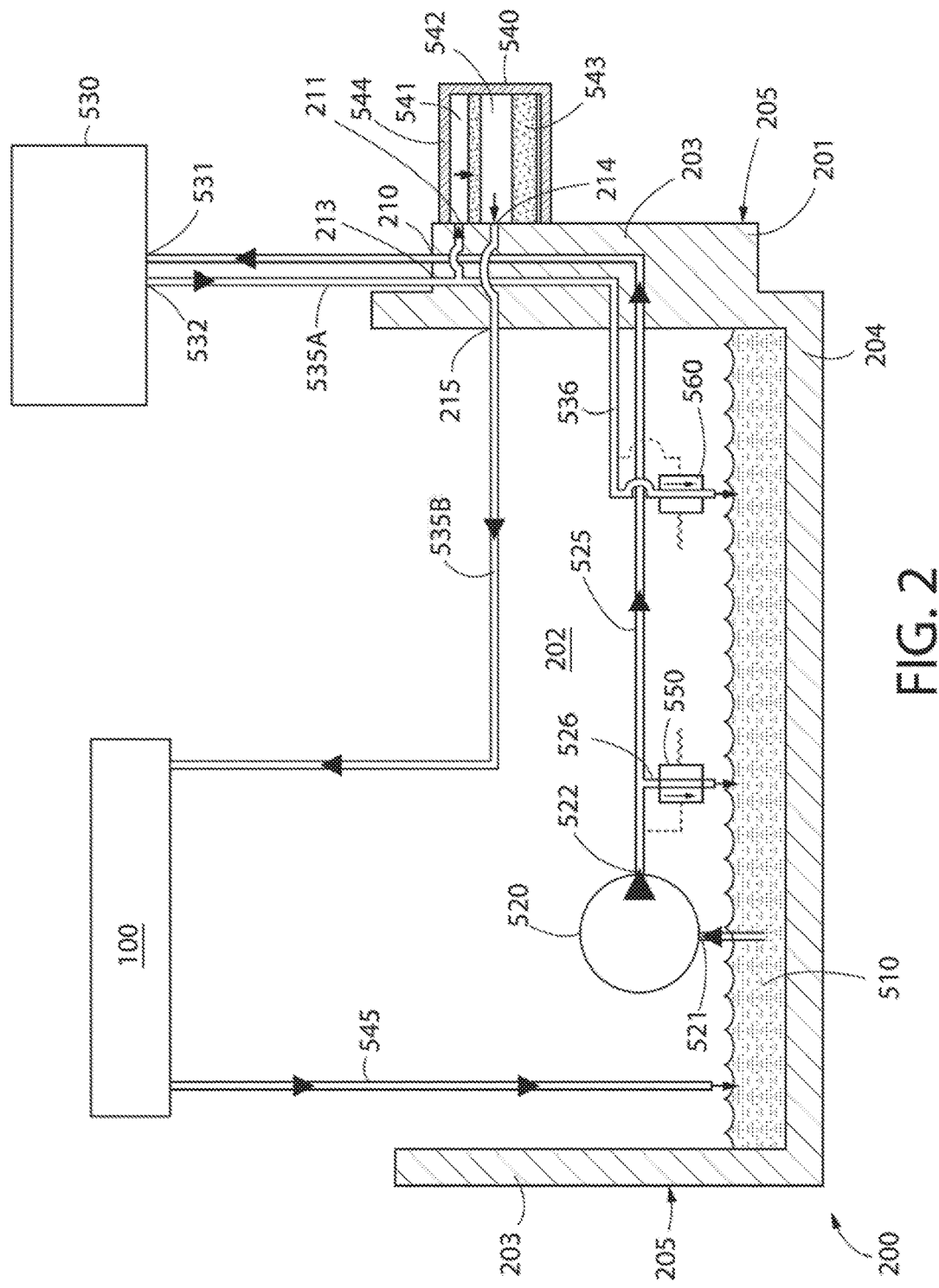
FIG. 2 is a schematic of an oil pan apparatus, in which an embodiment of the lubricating system of FIG. 1 has been incorporated, according to the present invention.

Referring now to FIG. 2, an oil pan apparatus 200 according to the present invention is schematically illustrated. The oil pan apparatus 200 generally comprises the lubricating system 500 of FIG. 1, which is incorporated into a body 201 that forms a basin 202. The body 201, as exemplified, is an oil pan for an internal combustion engine and forms a portion of the housing that forms the engine block. As used herein, the housing of the engine block includes, without limitation, the oil pan, the crankcase, the cylinder block, and the cylinder head.

In the oil pan apparatus 200, certain components of the lubricating system 500 have been formed into and/or or positioned within the body 201 that forms the basin 202 which acts as the oil pan. While the lubricating system 500 will be described herein in relation to being incorporated into the body 201, which forms the oil pan, the inventive concepts of the lubricating system 500 may be incorporated into an internal combustion engine in a variety manners and/or positions. For example, the lubricating system 500 may be incorporated into the housing of the engine block at other locations, such as the crankcase, the cylinder block, the cylinder head, or combinations thereof. Moreover, while a certain subset of the components of the lubricating system 500 will be exemplified herein as being positioned within or formed into the housing of the engine block (specifically the body 201 of the oil pan in the example), a different subset of the components of the lubricating system 500 can be located within or formed into the housing of the engine block in other structural arrangements of the invention.

The body 201 comprises an upstanding wall 203 and a floor 204 that collectively form the basin 202. The body 201 may be an integrally formed single component structure that can be formed by techniques such as, without limitation, forging, machining, casting, injection molding, or combinations thereof. Suitable materials for forming the body 201 include, without limitation, aluminum, cast iron, steel, thermoplastic polymers, thermoset polymer, or combinations thereof.

Figure 3:
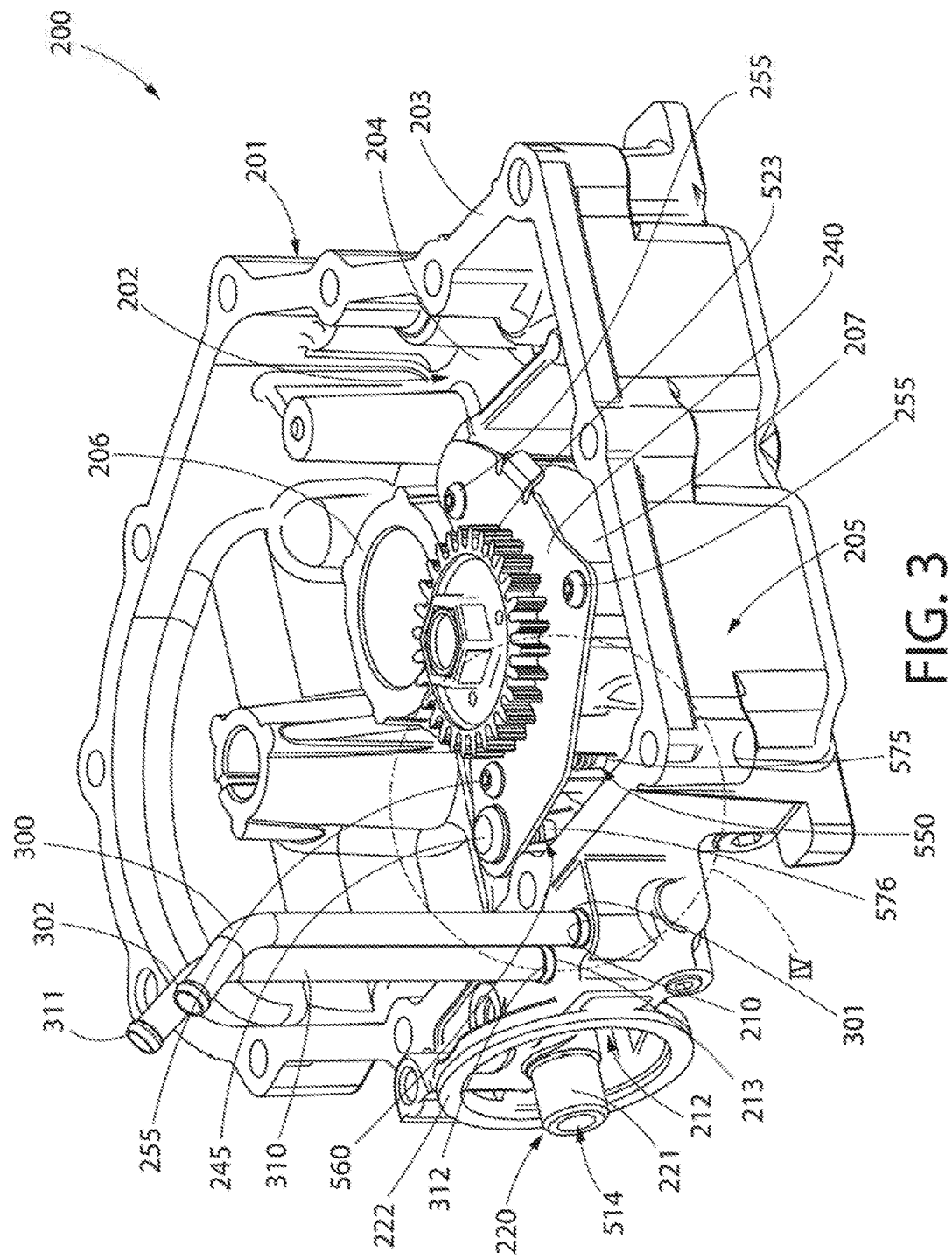
FIG. 3 is a perspective view a structural embodiment of the oil pan apparatus of FIG. 2.
Figure 4:
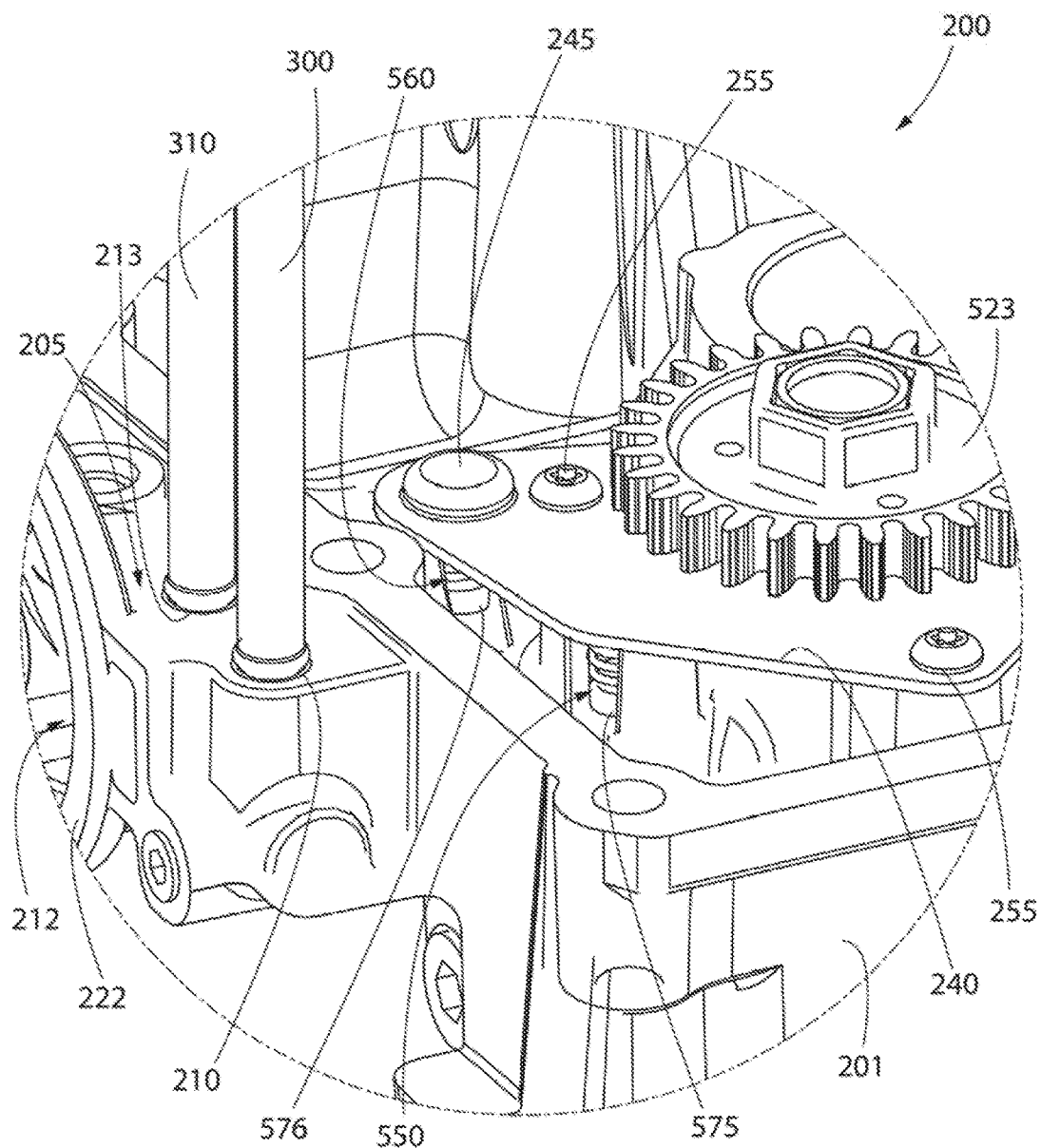
FIG. 4 is a close-up view of area IV of FIG. 3.
Figure 5:
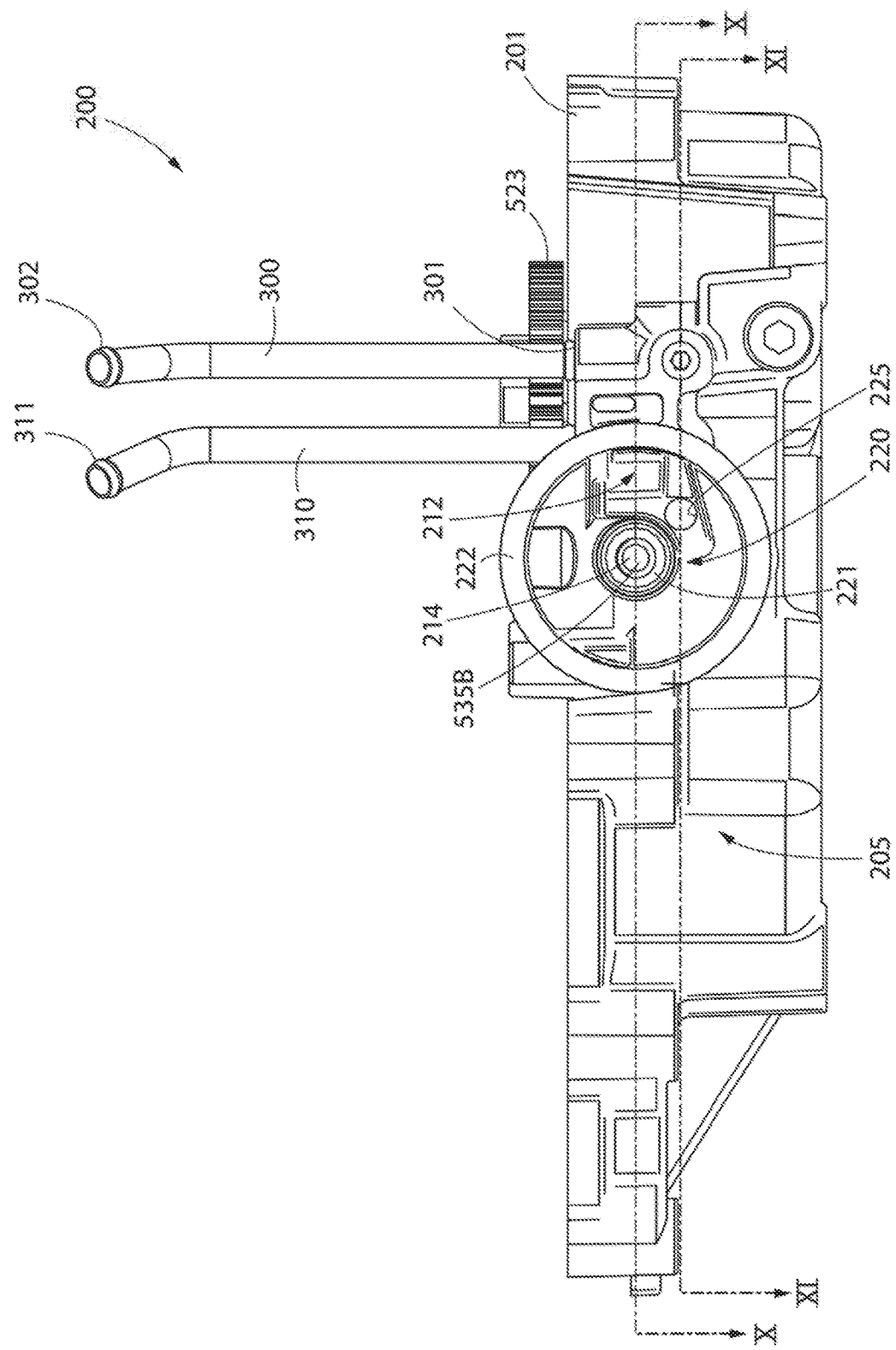
FIG. 5 is a left-side plan view of the oil pan apparatus of FIG. 2.
Figure 6:
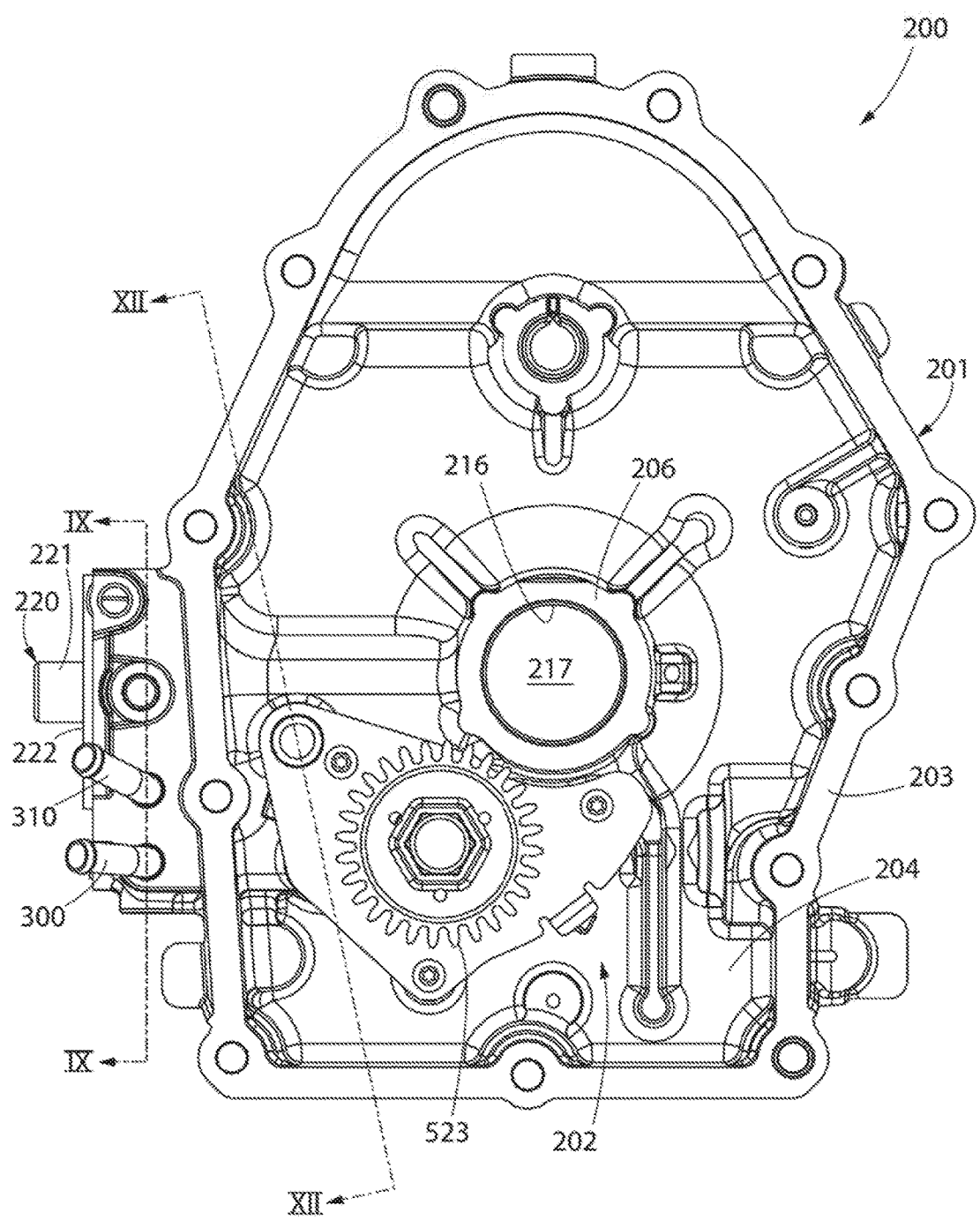
FIG. 6 is a top plan view of the oil pan apparatus of FIG. 2.
Figure 7:
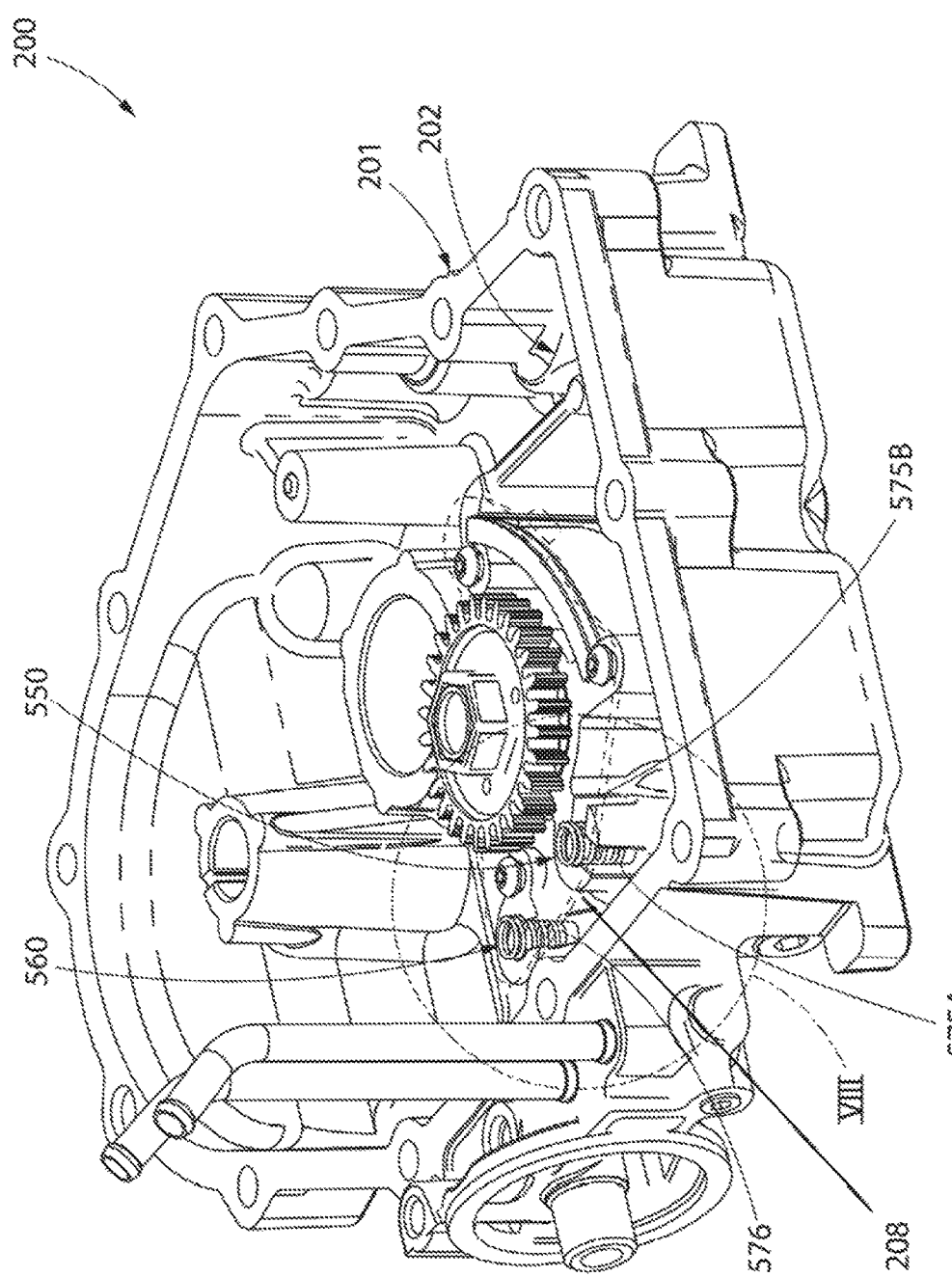
FIG. 7 is a perspective view of the oil pan apparatus of FIG. 2 wherein the oil pump cover plate is shown in phantom so that the first and second pressure relief valves are visible.

The oil reservoir 510, the oil pump 520, the first pressure relief valve 550 and the second pressure relief valve 560 are located within the basin 202 of the body 201. The oil filter 540 is mounted to an outer surface 205 of the body 201, and specifically to an outer surface 205 of the upstanding wall 203. The oil filter 540 is a spin-type oil filter that generally comprises a housing 544. The filter media 543 is positioned within the housing 544 and divides the cavity of the housing 544 into the inlet chamber 541 and the outlet chamber 542. The filter media 543 may be a hollow tubular structure such that when the filter media 543 is positioned within the housing 544, the inlet chamber 541 is an annular chamber located between the filter media 543 and an inner surface of the housing 544. The outlet chamber 542, in such an arrangement, may be formed by the inner surface of the filter media 543. In order to facilitate mounting of the oil filter 540 to the body 201, the housing 544 may have a cylindrical threaded portion (not shown) for threadily engaging a boss 221 (FIG. 3) protruding from an outer surface 205 of the body 201. In addition to, or instead of the spin-on filter, other types of oil filters 540 may be utilized in the oil circuit as desired, such as a cartridge type. Additionally, the oil filter 540 may be mounted to another part of the housing of the engine block, to another part of the internal combustion engine, or to a chassis to which the internal combustion engine is mounted. Such filters may be referred to as remote mounted oil filters.

The oil cooler 530 is not mounted directly to the body 530 in the exemplified arrangement. Rather, the oil cooler 530 is indirectly mounted to the body 201 by an oil cooler inlet conduit 300 and an oil cooler outlet conduit 310 (shown in FIG. 3). In order to stabilize the oil cooler 530 to the internal combustion engine, the oil cooler 530 may be mounted to another part of the housing of the engine block, to another part of the internal combustion engine, or to a chassis to which the internal combustion is mounted. In another configuration, the oil cooler 530 can be mounted directly to the body 201.

As discussed in greater detail below, at least a section of each of the oil cooler supply passage 525 and the oil cooler outlet passage 535 is formed by the body 201 of the oil pan apparatus 200. Additionally, as will be discussed in relation to the structural arrangement of FIGS. 3-12, at least a section of each of the first and second pressure relief passages 526, 536 is also formed by the body 201 in certain arrangements.

Referring now to FIGS. 3-12 concurrently, a specific structural arrangement of the oil pan apparatus 200 is disclosed. The oil pan apparatus 200 comprises a body 201 having an upstanding wall 203 and a floor 204 that collectively form a basin 202. The body 201 further comprises a plurality of walls, posts and other structures that protrude from the floor 204 of the basin 202 or from the outer surface 205 of the body 201. Walls, posts and other structures protruding from the floor 204 of the basin 202 include, without limitation, a crankshaft support post 206, oil pump retaining wall 207 (FIG. 10), pressure relief valve retaining wall 208 (FIGS. 7, 8, and 10), and post-filter oil delivery passage retaining wall 209 (FIG. 10). The purpose of these walls, posts and other structures will become apparent from the below discussion and/or will be readily discernible by one of skill in the art. As mentioned above, the body 201 may be an integrally formed single component structure that can be formed by techniques such as, without limitation, forging, machining, casting, injection molding, or combinations thereof. In other arrangements, the body 201 may be multi-component assembly wherein the components are coupled together subsequently.

Referring specifically now to FIGS. 3 and 9-11, oil gathers in the basin 202 of the body 201 to form the oil reservoir 510. The oil pump 520 (FIG. 10), which is exemplified as a trochoid-type pump, is located within the basin 202. Specifically, the oil pump 510 is located and mounted within the oil pump retaining wall 207. Operation of the oil pump 520 is driven by the crankshaft (not shown) via a pump gear 523 which is operably engaged to the crankshaft. A rod 527 is non-rotatably coupled to the pump gear 523 and extends through the inner rotor 528 of the oil pump 520. The rod 527 is non-rotatably coupled to the inner rotor 528 and has an end rotatably retained by the floor 204 of the body 201.

The oil pump 520 comprises an inlet 521 that is in fluid communication with the oil reservoir 510 and an outlet 522 that is in fluid communication with the oil cooler supply passage 525. The oil cooler supply passage 525 comprises a first section 525A and a second section 525B. The first section 525A of the oil cooler supply passage 525 is formed in the body 201 and extends from the outlet 522 of the oil pump 520 and terminates as a first opening 210 in the outer surface 205 of the body 201. The second section 525B is formed by an oil cooler inlet conduit 300. The oil cooler inlet conduit 300 comprises a first end 301 fluidly coupled to the body 201 to be in fluid communication with the first opening 210. The oil cooler inlet conduit 300 also comprises a second end 302 fluidly coupled to the inlet 531 of the oil cooler 530 (shown in FIG. 2). Thus, the second section 525B of the oil cooler supply passage 525 is located exterior of the body 201.

When the oil pump 520 is operated/activated, oil is drawn into the inlet 521 of oil pump and expelled via the outlet 522. The oil then flows sequentially through the first and second sections 525A, 525B of the oil cooler supply passage 525, and then into the oil cooler 530 for cooling (assuming that the first pressure relief valve 550 is in a closed state).

Cooled oil exiting the outlet 532 of the oil cooler 530 flows into the oil cooler outlet passage 535. The oil cooler outlet passage 535 comprises a pre-filter section 535A that extends from the outlet of the oil cooler 530 to a third opening 211 in the outer surface 205 of the body 201. The third opening 211 is in fluid communication with the inlet chamber 541 of the oil filter 540 (when an oil filter 540 is mounted to the body 201 as shown in FIG. 2). The third opening 211 may be located in a depression 212 in the outer surface 205 of the body 201. When the oil filter 540 is mounted to the body 201 (discussed in greater detail below), the depression 212 is covered by the oil filter 540 so that the inlet chamber 541 of the oil filter 540 is in fluid communication with the third opening 211. In such arrangements, the depression 212 may be considered as part of the oil cooler outlet passage 535, and specifically part of the pre-filter section 535A of the oil cooler outlet passage 535.

The pre-filter section 535A of the oil cooler outlet passage 535 comprises a first section 537 and a second section 538. The first section 537 of the oil cooler outlet passage 535 is formed by an oil cooler outlet conduit 310 and, thus, extends exterior of the body 201. The oil cooler outlet conduit 310 comprises a first end 311 and a second end 312. The first end 311 of the oil cooler outlet conduit 310 is fluidly coupled to the outlet 332 of the oil cooler 330. The second end 312 of the oil cooler outlet conduit 310 is fluidly coupled to the body 201 to be in fluid communication with a second opening 213 in the outer surface 205 of the body 201. Thus, the first section 537 of the pre-filter section 535A of the oil cooler outlet passage 535 extends from the outlet 532 of the oil cooler 530 to the second opening 213 in the outer surface 205 of the body 201.

The second section 538 of the pre-filter section 535A of the oil cooler outlet passage 535 is formed in the body 201 and extends from the second opening 213 to the third opening 211. As mentioned above, the third opening 211 is located in the outer surface 205 of the body 201 and is in fluid communication with the inlet chamber 541 of the oil filter 540 (when the oil filter 540 is mounted to the body 201 as shown in FIG. 2). When the oil pump 520 is operating (and assuming that the first pressure relief valve 550 is in a closed state), cooled oil exiting the outlet 532 of the oil cooler 530 flows sequentially through the first and second sections 537, 538 of the pre-filter section 535A of the oil cooler supply passage 525.

Assuming that the second pressure relief valve 560 is in a closed state, once the cooled oil reaches the depression 212 and the inlet chamber 541 of the oil filter 540, the cooled oil will pass through the filter media 543 and into the outlet chamber 542 of the oil filter 540 (as shown FIG. 2), thereby reaching the post-filter section 535B of the oil cooler outlet passage 535. The post-filter section 535B of the oil cooler outlet passage 535 is formed in the body 201 and extends from a fourth opening 214 in the outer surface 205 of the body 201 to a fifth opening 215 in the outer surface 205 of the body 201.

The fourth opening 214 is in fluid communication with the outlet chamber 542 of the oil filter 540 (when an oil filter 540 is mounted to the body 201 as shown in FIG. 2). When the oil filter 540 is mounted to the body 201 (discussed in greater detail below), the fourth opening 214 is covered by the oil filter 540 so that the outlet chamber 542 of the oil filter 540 is in fluid communication with the fourth opening 214. The fifth opening 215, in the exemplified arrangement, is located on a wall 216 of a central opening 217 of the crankshaft support post 206. The wall 216 can be considered part of the outer surface 205 of the body 201. After exiting the fifth opening 215, the oil is delivered to the portions 100 of the internal combustion engine to be lubricated.

The body 201 also comprises an oil filter mounting element 220 for facilitating mounting of the oil filter 540 to the body 201. In the exemplified arrangement, the oil filter mounting element 220 comprises a boss 221. The boss 221 may comprises a threaded outer surface for facilitating threaded coupling of the oil filter 540 thereto, as is known in the art. The fourth opening 214 is located on a distal surface of the boss 221. Thus, the post-filtered section 535B of the oil cooler outlet passage 535 extends through the boss 221.

The body 201 also comprises an annular rim 222 surrounding the boss 221. The annular rim 222 provides a surface to facilitate sealing of the inlet chamber 541 of the oil filter 540 relative to the external environment. For example, when the oil filter 540 is threaded onto the boss 221, an O-ring gasket may become compressed between the housing 544 and the annular rim 222, thereby sealing the inlet chamber 541 of the oil filter 540 relative to the external environment.

Each of the third and fourth openings 211, 214 is located adjacent to or on the oil filter mounting element 220. The third opening 211 is positioned such that it will be in fluid communication with the inlet chamber 541 of the oil filter 540 when the oil filter 540 is mounted to body 201 using the oil filter mounting element 220. In the exemplified arrangement, the depression 212 (in which the third opening 211 is located) is located on the outer surface 205 of the body 201 at a position between the boss 221 and the annular rim 222. The third opening 211 is positioned such that it will be in fluid communication with the outlet chamber 542 of the oil filter 540 when the oil filter 540 is mounted to body 201 using the oil filter mounting element 220. In the exemplified arrangement, the fourth opening 214 is located on the filter mounting element 220.

Referring now to FIGS. 3-4, 7-8 and 10-12, the first pressure relief valve 550 and the second relief pressure relief valve 560 are located within the basin 202 of the body 201. The first and second pressure relief valves 550, 560 are mounted within the pressure relief valve retaining wall 208 of the body 201.

Figure 8:
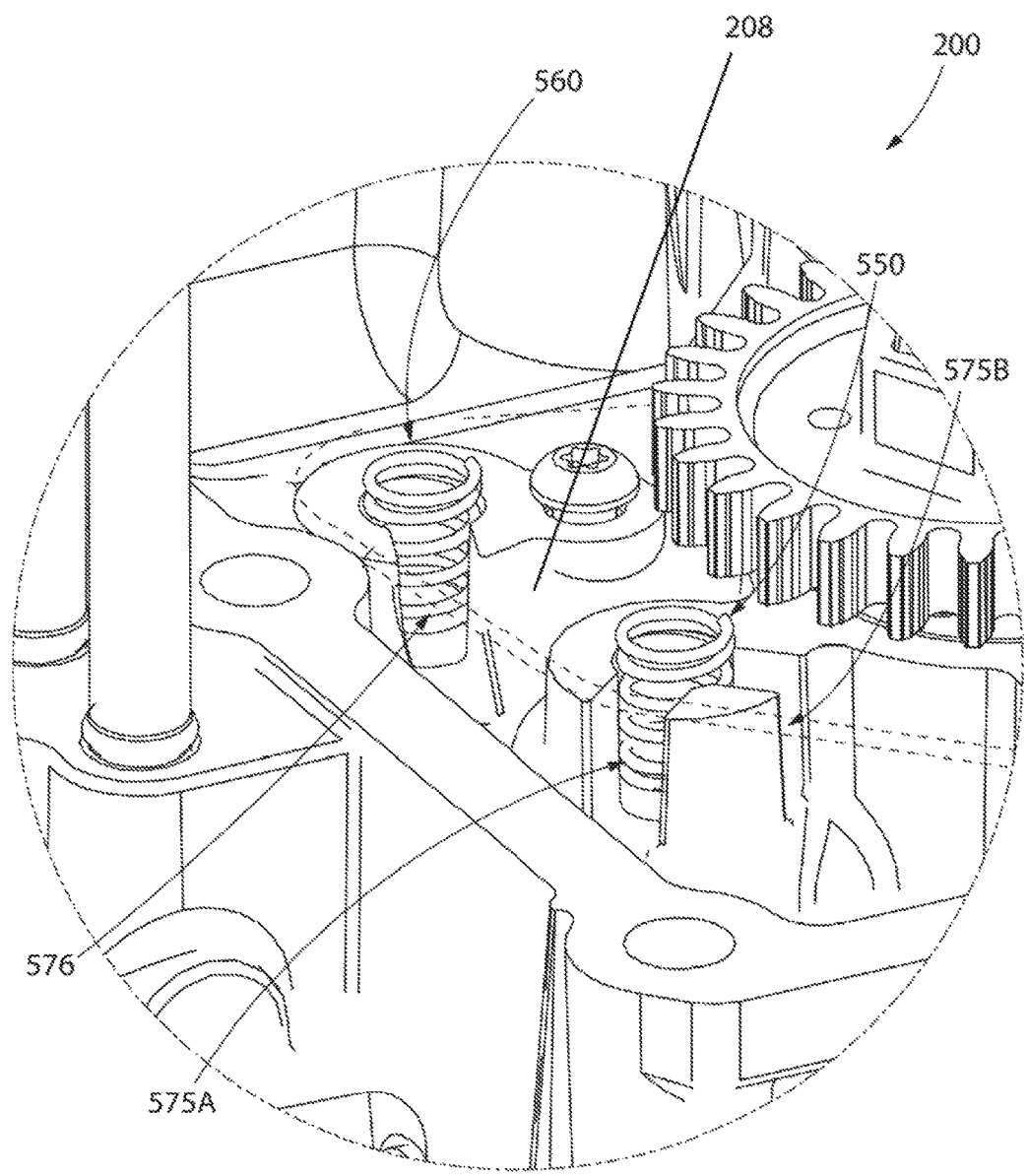
FIG. 8 is a close-up view of area VIII of FIG. 7.
Figure 9:
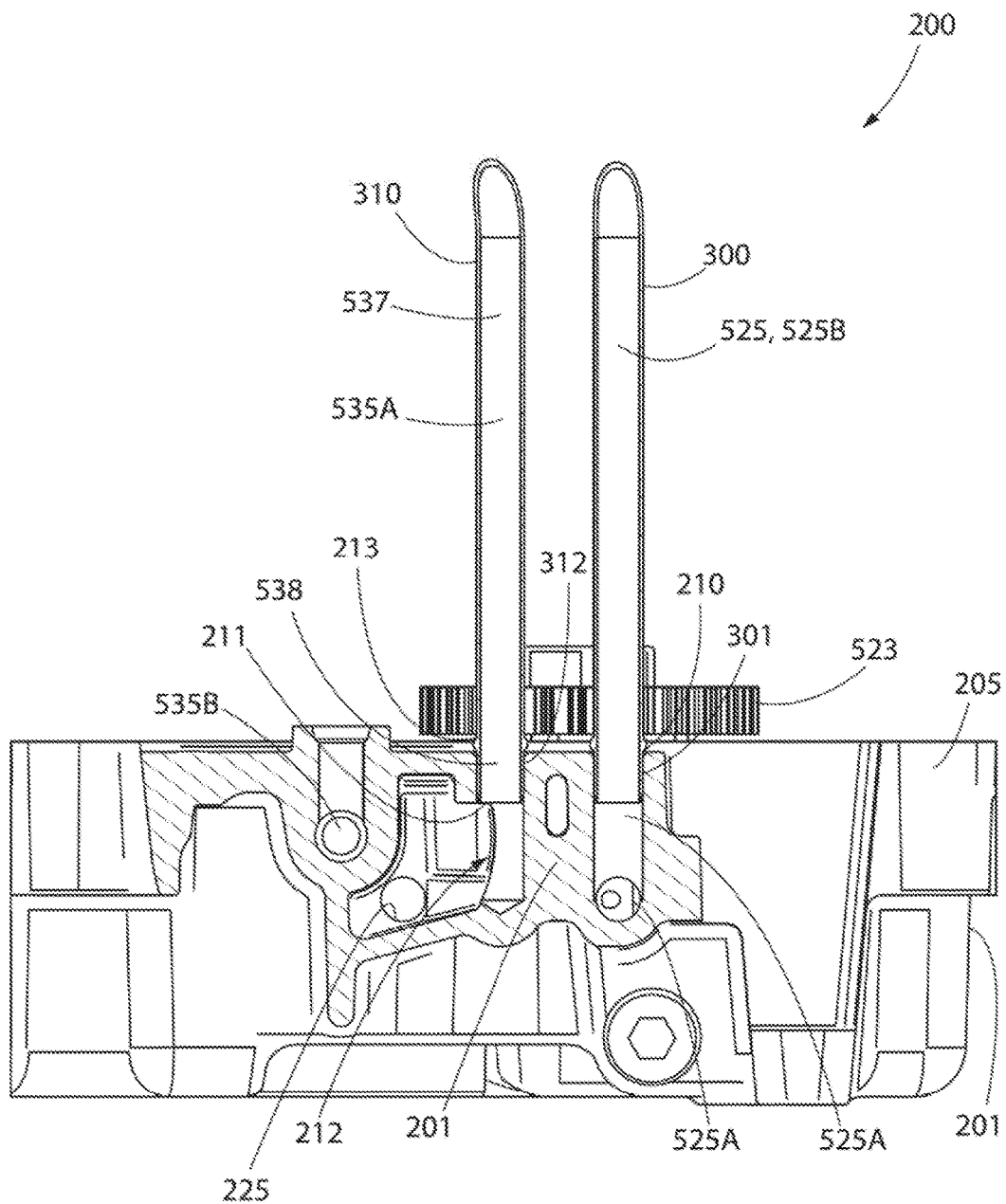
FIG. 9 is a vertical cross-sectional view of the oil pan apparatus take along view IX-IX of FIG. 6.

The first pressure relief valve 550 is operably coupled to the oil cooler supply passage 525 as discussed above. In the exemplified arrangement, the first pressure relief valve 550 is operably coupled to the first section 525A of the oil cooler supply passage 525, which is formed by the body 201. Specifically, the first pressure relief valve 550 is operably coupled to the first section 525A of the oil cooler supply passage 525 by the first pressure relief passage 526. The first pressure relief passage 526 is formed into the body 201 and is in fluid communication with the first section 525A of the oil cooler supply passage 525. The first pressure relief passage 526 extends from the first section 525A of the oil cooler supply passage 525 to an outlet 575. As best shown in FIGS. 8 and 10, the outlet 575 is divided into two outlet openings 575A, 575B that open into the basin 202 and, thus, are in fluid communication with the oil reservoir 510 held therein. The first pressure relief valve 550 is disposed within the first pressure relief passage 526 and, thus, controls whether or not oil can flow through first pressure relief passage 526 to be expelled from the outlet 575 and back into the oil reservoir 510 prior to passing through the oil cooler 530. In the exemplified, arrangement, opening of the first pressure relief valve 550 allows oil in the oil cooler supply passage 525 to return to the oil reservoir in the basin 202 without ever exiting the body 201 (i.e., before exiting the first opening 210. As discussed in greater detail above, the first pressure relief valve 550 opens when the pressure in the oil cooler supply passage 525 reaches or exceeds the first predetermined pressure.

As mentioned above, one of the primary functions of the first pressure relief valve 550 is to relieve pressure in the oil cooler supply passage 525 during cold engine start-ups when the oil is cold and, thus, has a high viscosity. Therefore, in an effort to accommodate adequate flow of the highly viscous oil through the first pressure relief passage 526 when the pressure within the oil cooler supply passage 525 meets or exceeds the first predetermined pressure (and the first pressure relief valve 550 is open), the outlet 575 of the first pressure relief passage 526 is designed to have a first effective cross-sectional area that is sufficiently large such that the cold oil (which has a high viscosity) can flow therethrough in a substantially unimpeded manner and does not create further pressure build-up in the oil cooler supply passage 525. In the exemplified arrangement, the first effective cross-sectional area is the sum of the cross-sectional areas of the two outlet openings 575A, 575B.

The second pressure relief valve 560 is operably coupled to the oil cooler outlet passage 535 as discussed above. In the exemplified arrangement, the second pressure relief valve 560 is operably coupled to the pre-filtered section 535A of the oil cooler outlet passage 535, and more specifically to the second section 538 of the pre-filtered section 535A of the oil cooler outlet passage 535. As exemplified, the second pressure relief valve 560 is operably coupled to the second section 538 of the pre-filtered section 535A of the oil cooler outlet passage 535 by the second pressure relief passage 536. The second pressure relief passage 536 is formed by the body 201 and is in fluid communication with the second section 538 of the pre-filtered section 535A of the oil cooler outlet passage 535. The second pressure relief passage 536 is in fluid communication with the second section 538 of the pre-filtered section 535A of the oil cooler outlet passage 535 via a sixth opening 225 located in the depression 212. Thus, the second pressure relief passage 536 is in fluid communication with cooled oil entering the depression 212 via the third opening 211 at a position upstream of the oil filter 540.

The second pressure relief passage 536 extends from the second section 538 of the pre-filtered section 535A of the oil cooler outlet passage 535 to an outlet 576. As best shown in FIGS. 8 and 10, the outlet 576 opens into the basin 202 and, thus, is in fluid communication with the oil reservoir 510 held therein. The second pressure relief valve 560 is disposed within the second pressure relief passage 536 and, thus, controls whether or not oil can flow through second pressure relief passage 536 to be expelled from the outlet 576 and back into the oil reservoir 510 after passing through the oil cooler 530 (and prior to flowing through the filter media 543). As discussed in greater detail above, the second pressure relief valve 560 opens when the pressure in the second section 538 of the pre-filtered section 535A of the oil cooler outlet passage 535 reaches or exceeds the second predetermined pressure. Opening so of the second pressure relief valve 560 allows oil that has passed through the oil cooler 530 (but not yet passed through the oil filter 540 in the exemplified arrangement), to return to the oil reservoir in the basin 202 without having to pass through the filter media 543 and/or being supplied to the portions 100 of the internal combustion engine to be lubricated. Thought of another way, the second pressure relief valve 560 allows cooled oil that has passed through the oil cooler 530 to return to the oil reservoir 510 in the basin 202 without passing through the fourth opening 514.

As mentioned above, one of the primary functions of the second pressure relief valve 560 is to relieve pressure in the oil circuit during normal engine operating conditions while at the same time maximizing the amount of the oil that passes through the oil cooler 530. Thus, the second predetermined pressure is selected to be sufficiently less than the first predetermined pressure so that the second pressure relief valve 560 opens well before the first pressure relief valve 550 opens. Thus, pressure relief within the oil circuit is achieved while still ensuring that the oil is being cooled. In the exemplified arrangement, the second effective cross-sectional area of the outlet 576 of the second pressure relief passage 536 is less than the first effective cross-sectional area of the outlet 575 of the first pressure relief passage 526. In theory, full pump output minus bearing needs must pass through outlet 575 when the oil is cold, while full pump output minus bearing needs must pass through outlet 576 when the oil is hot.

Referring now to FIGS. 3-4, 7-8 and 13A-B, the first and second pressure relief valves 550, 560 are check valves. The first pressure relief valve 550 generally comprises a first valve seat 551, a first valve body 552, and a first resilient element 553 that biases the first valve body 552 into the first valve seat 551 to close the first pressure relief valve 550. Similarly, the second pressure relief valve 560 comprises a second valve seat 561, a second valve body 562, and a second resilient element 563 that biases the second valve body 562 into the second valve seat 561 to close the second pressure relief valve 560.

In the exemplified arrangement, each of the first and second valve bodies 552, 562 is a ball. Moreover, each of the first and second resilient elements 553, 563 is a compression coil spring. The first and second valve bodies 552, 562 and the first and second resilient elements 553, 563 may take on other structures in other arrangements, the exact nature of which will depend on the type and structure of the valves selected for the first and second pressure relief valves 550, 560. For example, other suitable structures for the first and second valve bodies 552, 562 may include, without limitation, piston-like structures, plungers, plates, conical-like structures). Other suitable structures for the first and second resilient elements 553, 563 include other types of variable springs (including tension springs, leaf springs, flat springs, cantilever springs, conical springs, V-springs, bodies formed of an elastomeric material (including rubbers and thermoplastic elastomers). Alternatively, any other means of applying a force that is not a fixed or rigid body may be used, such as a hydraulic piston or an electromagnet.

Each of the first and second pressure relief valves 550, 560 are normally biased into the closed state. In the exemplified embodiment, this is achieved by the first and second resilient elements 553, 563 being under compression between a bottom surface 241 of a plate 240 and the first and second valve bodies 552, 562 respectively. The plate 240, in the exemplified arrangement, is a cover plate for the oil pump 520. In other arrangements, the plate 240 may be a different part of the internal combustion engine. For example, the plate 240 could be a wall, floor or other structure of the body 201, or another plate located within the housing of the engine block.

The cover plate 240 is secured to the oil pump retaining wall 207 by a plurality of fasteners 255. When the plate 240 is secured to the oil pump retaining wall 207, each of the first and second resilient elements 553, 563 are under compression due to being axially constrained by the bottom surface 241 of the cover plate 240 at an upper end thereof and the first and second valve bodies 251, 261 at a lower end thereof. Thus, the first and second pressure relief valves 550, 560 are normally biased into the closed state.

Figure 13A:
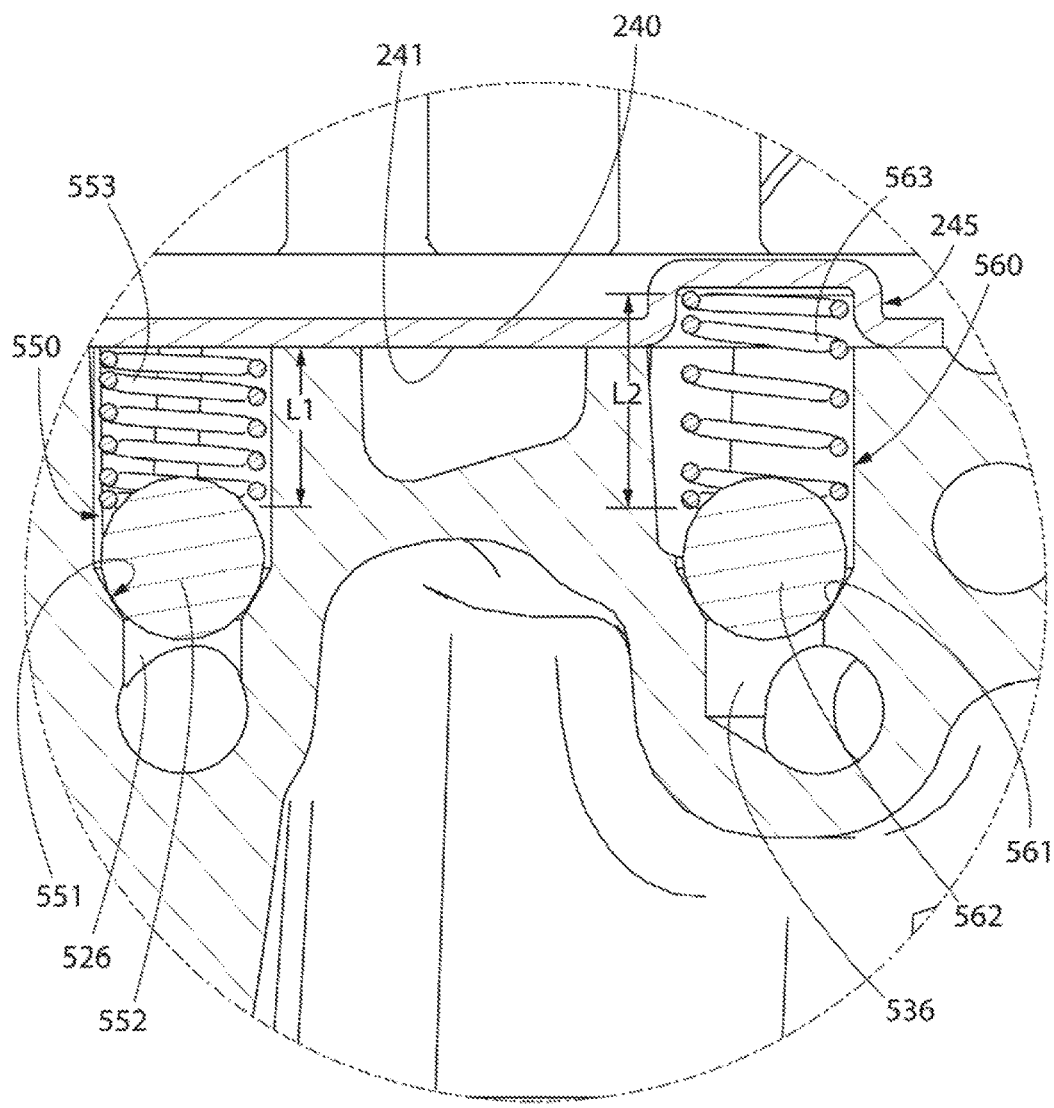
FIG. 13A is a close-up view of area XIII of FIG. 12 in which the resilient elements of the first and second pressure relief valves are compressed by the oil pump cover plate.
Figure 13B:
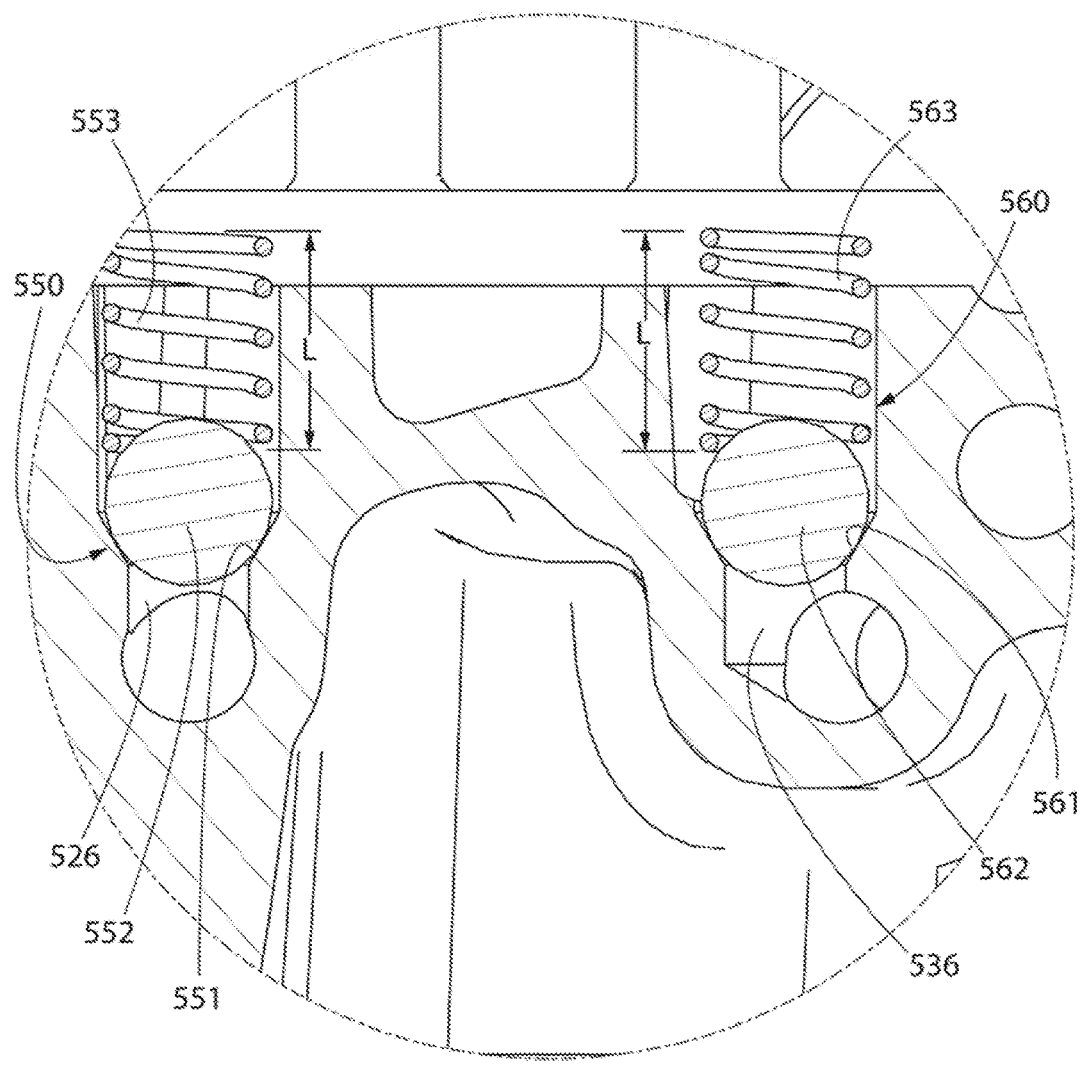
FIG. 13B is a close-up view of area XIII of FIG. 12 in which the oil pump cover plate has been removed so that it can be seen that the resilient elements of the first and second pressure relief valves are identical coil springs.

As discussed above, the first pressure relief valve 550 is configured to open at a first predetermined pressure while the second pressure relief valve 560 is configured to open at a second predetermined pressure. Thus, the first and second pressure relief valves 550, 560 have different pressure settings, despite the first and second resilient elements 553, 563 being identical to one another (which in the exemplified arrangement are identical compression coil springs). Prior to being constrained (and compressed) by the cover plate 240, the first and second resilient elements 553, 563 have the same length L (as shown in FIG. 13B). Once the cover plate 240 is secured to the to the oil pump retaining wall 207, the first resilient element 553 is compressed to a first length L1 and the second resilient element 563 is compressed to a second length L2, wherein the first length L1 is less than the second length L2 (as shown in FIG. 13A). The second length L2 may be less than the length L.

As a result of the first length L1 being less than the second length L2, the first pressure relief valve 550 has a pressure setting that is greater than the pressure setting of the second pressure relief valve 560 (i.e., the first predetermine pressure is greater than the second predetermined pressure). Thus, despite identical resilient elements 553, 563 being used in the first and second pressure relief valves 550, 560, different pressure settings are achievable. As will be noted from FIG. 13A, the bottom surface 241 of the cover plate 240 comprises a topographical feature 245 that creates the difference between the first length L1 and the second length L2. The topographical feature 245, in the exemplified arrangement, is a detent (as viewed from the bottom surface 241) that is contacted by the second resilient element 563. Because the second resilient element 563 extends into and contacts the floor of the detent 245 and the first resilient element 553 contacts the major surface of the bottom surface 241, the second resilient element 563 is compressed a smaller amount as compared to the first resilient element 553 when the cover plate 240 is secured into place.

While the topographical feature 245 is exemplified as a detent, the topographical feature 245 in other arrangement may be a protuberance that extends from the bottom surface 241 of the plate 240. In such an arrangement, the topographical feature 245 may be repositioned on the plate 240 so as to come into contact with the first resilient element 553, rather than the second resilient element 563. As a result, the protuberance will result in the first resilient element 553 being compressed a greater amount than the second resilient element 563, wherein the second resilient element 563 which may contact the major surface of the bottom surface 240.

In still other arrangements, multiple topographical features 245 may be provided on the bottom surface 241 of the plate 240 such that each of the first and second resilient elements 553, 563 may contact a different one of the topographical features 245. In such an arrangement, the topographical features 245 are configured to have a relative difference in axial height (measured relative to the compression axes of the first and second resilient elements 553, 563). As used herein, a stepped surface qualifies as a topographical feature 245.

In further arrangements, the difference between the first and second lengths L1, L2 can be achieved by using a cover plate 240 that has a bottom surface that is free of topographical features 245 by either: (1) angling the plate 240 relative to the compression axes of the first and second resilient elements 553, 56; or (2) positioning the first and second seats 551, 561 at different depths within the body 201 from the bottom surface 241 of the plate 240.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A valve system comprising:
   a fluid pathway for transporting a fluid;
   a first valve operably coupled to the fluid pathway, the first valve comprising a first resilient element;
   a second valve operably coupled to the fluid pathway, the second valve comprising a second resilient element that is substantially identical to the first resilient element;
   wherein, when the first valve is in a closed state, the first resilient element is compressed to a first length so that the first valve opens at a first pressure; and
   wherein, when the second valve is in a closed state, the second resilient element is compressed to a second length so that the second valve opens at a second pressure, the first length is less than the second length such that the second pressure is less than the first pressure.

2. The valve system of claim 1 further comprising:
the first valve comprising a first valve seat and a first valve body, the first resilient element biasing the first valve body into the first valve seat to close the first valve; and
the second valve further comprising a second valve seat and a second valve body, the second resilient element biasing the second valve body into the second valve seat to close the second valve.

3. The valve system of claim 2 wherein the first and second valve seats are structurally identical to one another.

4. The valve system of claim 2 wherein the first and second valve bodies are structurally identical to one another.

5. The valve system of claim 1 further comprising:
a body;
the fluid pathway comprising a first section formed in the body and a second portion formed in the body; and
the first valve operably coupled to the first section and the second valve operably coupled to the second section.

6. The valve system of claim 5 wherein the body is a portion of a housing of an engine block.

7. The valve system of claim 5 wherein the first valve comprises a first valve seat integrally formed as part of the body and the second valve comprises a second valve seat integrally formed as part of the body.

8. The valve system of claim 1 further comprising:
a cover comprises a topographical feature; and
the first and second resilient elements compressed by the cover, one of the first or second resilient elements contacting the topographical feature, thereby accounting for the difference between the first length and the second length.

9. The valve system of claim 1 wherein the first valve comprises a first valve seat at a first depth and the second valve comprises a second valve seat at a second depth, the second depth being different than the first depth, thereby accounting for the difference between the first length and the second length.

10. The valve system of claim 1 wherein the first pressure relief valve has an outlet having a first effective cross-sectional area and the second relief valve having an outlet having a second effective cross-sectional area that is different than the first effective cross-sectional area.

11. A valve system comprising:
a fluid pathway for transporting a fluid;
a first valve operably coupled to the fluid pathway, the first valve comprising a first resilient element having a first spring constant;
a second valve operably coupled to the fluid pathway, the second valve comprising a second resilient element having a second spring constant;
the second spring constant being substantially the same as the first spring constant;
wherein, when the first valve is in a closed state, the first resilient element is deformed a first degree so that the first valve opens at a first pressure; and
wherein, when the second valve is in a closed state, the second resilient element is deformed a second degree so that the second valve opens at a second pressure that is different than the first pressure.

12. The valve system of claim 11 further comprising:
the first valve comprising a first valve seat and a first valve body, the first resilient element biasing the first valve body into the first valve seat to close the first valve; and
the second valve further comprising a second valve seat and a second valve body, the second resilient element biasing the second valve body into the second valve seat to close the second valve.

13. The valve system of claim 11 further comprising:
a body;
the fluid pathway comprising a first section formed in the body and a second portion formed in the body; and
the first valve comprises a first valve seat integrally formed as part of the body and the second valve comprises a second valve seat integrally formed as part of the body.

14. The valve system of claim 13 wherein the body is a portion of a housing of an engine block.

15. The valve system of claim 11 further comprising:
a cover comprises a topographical feature; and
the first and second resilient elements compressed by the cover, one of the first or second resilient elements contacting the topographical feature, thereby accounting for the difference between the first length and the second length.

16. The valve system of claim 11 wherein the first valve comprises a first valve seat at a first depth and the second valve comprises a second valve seat at a second depth, the second depth being different than the first depth, thereby accounting for the difference between the first and second degrees of deformation.

17. A valve system comprising:
a monolithic body;
a fluid pathway for transporting a fluid, the fluid pathway comprising a first section formed in the monolithic body and a second section formed in the monolithic body;
a first valve operably coupled to the first section of the fluid pathway, the first valve comprising a first valve seat integrally formed as part of the monolithic body; and
a second valve operably coupled to the second section of the fluid pathway, the second valve comprising a second valve seat integrally formed as part of the monolithic body;
a cover comprising a topographical feature;
the first valve comprises a first resilient element and the second valve comprising a second resilient element; and
the first and second resilient elements compressed by the cover, one of the first or second resilient elements contacting the topographical feature, thereby accounting for a difference in length between the first and second resilient elements.

18. The valve system of claim 17 wherein the monolithic body is a portion of an oil pan configured to be coupled to an engine block.

19. A valve system comprising:
a body;
a fluid pathway for transporting a fluid, the fluid pathway comprising a first section formed in the body and a second portion formed in the body;
a first valve operably coupled to the first section of the fluid pathway, the first valve comprising a first valve seat integrally formed as part of the body; and
a second valve operably coupled to the second section of the fluid pathway, the second valve comprising a second valve seat integrally formed as part of the body;
wherein the first valve seat being at a first depth within the body and the second valve seat being at a second depth within the body.

* * * * *